United States Patent
Kim et al.

(10) Patent No.: US 12,462,356 B2
(45) Date of Patent: Nov. 4, 2025

(54) APPARATUS AND METHOD FOR PREDICTING COMPRESSION QUALITY OF IMAGE IN ELECTRONIC DEVICE

(71) Applicant: SAMSUNG ELECTRONICS CO., LTD., Suwon-si (KR)

(72) Inventors: Kyuwon Kim, Suwon-si (KR); Tushar Balasaheb Sandhan, Suwon-si (KR); Chulju Yang, Suwon-si (KR); Heekuk Lee, Suwon-si (KR); Inho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 341 days.

(21) Appl. No.: 17/970,482

(22) Filed: Oct. 20, 2022

(65) Prior Publication Data

US 2023/0102895 A1 Mar. 30, 2023

Related U.S. Application Data

(63) Continuation of application No. PCT/KR2022/014632, filed on Sep. 29, 2022.

(30) Foreign Application Priority Data

Sep. 30, 2021 (KR) .......................... 10-2021-0130181
Nov. 9, 2021 (KR) .......................... 10-2021-0153020

(51) Int. Cl.
*G06T 5/00* (2024.01)
*G06T 5/70* (2024.01)
(Continued)

(52) U.S. Cl.
CPC ................. *G06T 5/77* (2024.01); *G06T 5/70* (2024.01); *G06T 9/00* (2013.01); *G06V 10/50* (2022.01);
(Continued)

(58) Field of Classification Search
CPC .... G06T 5/77; G06T 5/70; G06T 9/00; G06T 2207/20182; G06T 2207/30168;
(Continued)

(56) References Cited

U.S. PATENT DOCUMENTS 11,153,575 B2   10/2021  Lee et al.
11,303,805 B2    4/2022  Han et al.
(Continued)

FOREIGN PATENT DOCUMENTS

CN   106295682 A   1/2017
CN   107743235 A   2/2018
(Continued)

OTHER PUBLICATIONS

Marius Pedersen et al., "Image Quality Assessment by Comparing CNN Features between Images", Nov. 2016, Journal of Imaging Science and Technology, 60(6):604101-6041010, DOI: 10.2352/J.ImagingSci.Technol.2016.60.6.060410.
(Continued)

*Primary Examiner* — Susan E. Hodges
(74) *Attorney, Agent, or Firm* — NIXON & VANDERHYE P.C.

(57) ABSTRACT

A method and/or device for predicting a compression quality of an image during image correction (e.g., image quality enhancement) in an electronic device, and/or processing the image, based on at least the prediction, may be provided. The electronic device may include a display module, a memory, and a processor, wherein the processor may operate to display an image through the display module, extract designated multiple blocks from the image in a designated scheme, estimate confidence for each of the multiple blocks, identify, based on the estimation of the confidence, a first block corresponding to an outlier to be excluded in quality prediction, and a second block for which quality prediction
(Continued)

is possible, among the multiple blocks, exclude the first block among the multiple blocks from a subject of quality prediction, and classify a compression quality of the image by using at least the second block remaining after excluding the first block from among the multiple blocks.

17 Claims, 12 Drawing Sheets

(51) Int. Cl.
    *G06T 5/77*     (2024.01)
    *G06T 9/00*     (2006.01)
    *G06V 10/50*     (2022.01)
    *G06V 10/74*     (2022.01)
    *G06V 10/762*     (2022.01)
    *G06V 10/764*     (2022.01)

(52) U.S. Cl.
    CPC .......... *G06V 10/761* (2022.01); *G06V 10/762* (2022.01); *G06V 10/764* (2022.01); *G06T 2207/20182* (2013.01); *G06T 2207/30168* (2013.01)

(58) Field of Classification Search
    CPC ............. G06T 2207/10016; G06T 5/60; G06T 2207/20021; G06T 2207/20052; G06T 2207/20081; G06T 2207/20084; G06T 7/0002; G06V 10/50; G06V 10/761; G06V 10/762; G06V 10/764; E06B 9/24; H04N 1/41; H04N 19/119; H04N 19/154; H04N 19/176; H04N 19/86
    USPC ......................................................... 386/328
    See application file for complete search history.

(56) References Cited

U.S. PATENT DOCUMENTS

| | | | |
|---|---|---|---|
| 2008/0259170 A1* | 10/2008 | Hatanaka ........... | H04N 23/6812 348/208.6 |
| 2008/0317376 A1* | 12/2008 | Kasperkiewicz ......... | G06T 5/00 715/702 |
| 2010/0066861 A1* | 3/2010 | Sakagami .............. | H04N 23/74 348/333.12 |
| 2011/0043704 A1* | 2/2011 | Shoji .................... | H04N 9/3182 348/E5.074 |
| 2011/0188744 A1 | 8/2011 | Sun | |
| 2011/0222786 A1 | 9/2011 | Carmel et al. | |
| 2018/0137605 A1 | 5/2018 | Otsuka et al. | |
| 2018/0324438 A1 | 11/2018 | Kwak | |
| 2019/0281310 A1 | 9/2019 | Lee et al. | |
| 2019/0362484 A1 | 11/2019 | Po et al. | |
| 2021/0037182 A1* | 2/2021 | Han ........................ | H04N 1/41 |
| 2022/0147161 A1 | 5/2022 | Jung et al. | |

FOREIGN PATENT DOCUMENTS

| | | |
|---|---|---|
| JP | H06-125545 A | 5/1994 |
| JP | 5844263 B2 | 11/2015 |
| KR | 10-2016-0150650 A | 12/2016 |
| KR | 10-2019-0105745 A | 9/2019 |
| KR | 10-2021-0014303 A | 2/2021 |
| KR | 10-2022-0124528 | 9/2022 |
| WO | WO 2011/097060 A2 | 8/2011 |
| WO | WO 2019/151808 A1 | 8/2019 |
| WO | WO 2023/055112 A1 | 4/2023 |

OTHER PUBLICATIONS

Hannah R. Kerner et al., "Context-dependent image quality assessment of JPEG compressed Mars Science Laboratory Mastcam images using convolutional neural networks", Computers & Geosciences, vol. 118, Sep. 2018, pp. 109-121.
Extended European Search Report dated Sep. 9, 2024 for EP Application No. 22876884.2.
PCT International Search Report dated Jan. 5, 2023 for PCT/KR2022/014632.
PCT Notification of Publication dated Apr. 6, 2023 for PCT/KR2022/014632.
Pedersen et al., "Image Quality Assessment by Comparing CNN Features between Images", Journal of Imaging Science and Technology, Nov. 2016, pp. 060410-1-060410-10.
Kerner et al., "Context-dependent image quality assessment of JPEG compressed Mars Science Laboratory Mastcam images using convolutional neural networks", Computers & Geosciences vol. 118, Sep. 2018, pp. 109-121.
Uchida et al., "Pixelwise jpeg compression detection and quality factor estimation based on convolutional neural network", International Symposium on Electronic Imaging, Jan. 2019, pp. 276.1-276.7.
Kim et al., "AGARnet: adaptively gated jpeg compression artifacts removal network for a wide range quality factor", IEEE Access, vol. 8, Jan. 23, 2020, pp. 20160-20170.
Kim et al., "Quality Level Prediction of Image Compression using Block-wise Confidence-aware CNN", BMVC 2021, pp. 1-13.
Office Action for IN Application No. 202427023709 dated Jul. 10, 2025, 6 pages.
Office Action for KR Application No. 10-2021-0153020 dated Sep. 24, 2025 and English translation, 13 pages.

* cited by examiner

APPARATUS AND METHOD FOR PREDICTING COMPRESSION QUALITY OF IMAGE IN ELECTRONIC DEVICE

CROSS-REFERENCE TO RELATED APPLICATIONS

This application is a continuation of International Application No. PCT/KR2022/014632 designating the United States, filed on Sep. 29, 2022, in the Korean Intellectual Property Receiving Office and claiming priority to Korean Patent Application No. 10-2021-0130181, filed on Sep. 30, 2021, and to Korean Patent Application No. 10-2021-0153020, filed on Nov. 9, 2021, each KR application having been filed in the Korean Intellectual Property Office, the disclosures of which are incorporated by reference herein in their entireties.

BACKGROUND

Field

Example embodiments may relate to a method and/or an apparatus for predicting a compression quality of an image when correcting the image (e.g., enhancing the quality of the image) in an electronic device, and/or performing image processing based on the prediction.

Description of Related Art

With the development of digital technologies, various types of electronic devices are widely used, such as a mobile communication terminal, a personal digital assistant (PDA), an electronic notebook, a smartphone, a tablet personal computer (PC), a wearable device, and/or a laptop PC. The hardware parts and/or software parts of the electronic device are continually improving in order to improve support and increase functions thereof.

As the functions of electronic devices have become more diversified, electronic devices have been implemented in the form of multimedia devices having complex functions such as photographing or video filming, music or video file playback, gaming, broadcast reception, or a call function. Such an electronic device may include a display and may display a screen related to functions, based on the display.

An electronic device may display an image stored in the electronic device or an image acquired from an external device (e.g., a server and/or another electronic device), through a display. Recently, as the resolution and/or a physical size (e.g., a screen size of the display) of the electronic device increases, there is a need for enhancement of the quality of the image according thereto. For example, the importance of an image quality of an image provided by the electronic device or the external device has been increased.

The image provided by the external device may be compressed and transmitted. For example, to save the storage in a cloud environment and minimize or reduce latency of image transmission, the image may be compressed at a predetermined compression quality (or a compression rate) and provided. In such a case, compression method information (e.g., resolution information) and compression quality information (e.g., compression bit rate information) of an original image are lost, which has caused difficulty in determining the quality of the image related to the compression method information and the compression quality information of the original image and difficulty in setting the quality adequate for the original image, by an image display device, specifically, difficulty in implementing a maximum or high performance of a quality algorithm within the image display device.

Image compression may cause, for example, a compression artifact to be generated in an image. For example, in the image compression, one or more artifacts (e.g., ringing artifacts (or mosquito artifacts), blocking artifacts, blur artifacts, color distortion, and/or texture deviation) may be generated. In general, the higher the compression quality (or compression rate) of the image, more compression artifacts are generated. Accordingly, when an external device (e.g., a content server or a service provider such as other external device) provides an image to an electronic device, an issue relating to minimizing artifacts shown to a user while compressing the size of the image as much as possible minimum artifacts may be raised. In addition, recently, as the electronic device supports a large screen display, an image having hidden artifacts optimized to the conventional small screen may be easily exposed to a user upon provision of an enlarged image on a large screen. For example, the artifacts, which have not been identified on a small screen, may be identified by a user when being enlarged on a large screen, which causes the user to recognize the same as deterioration in the quality of an image.

SUMMARY

Various example embodiments may provide a method and an apparatus for accurately and promptly prediction of a compression quality of an image in an operation of determining the compression quality of the image during image quality enhancement (e.g., image correction) by an electronic device.

Various example embodiments may provide a method and an apparatus for predicting a compression quality of a given image, based on estimation of confidence in units of blocks during determining of the compression quality of the image by an electronic device.

Various example embodiments may provide a method and an apparatus for removing, from a given image, an outlier corresponding to a region in which compression quality prediction is difficult to be performed (e.g., a region to be excluded in quality prediction) while estimating confidence in units of blocks for the image by an electronic device, and accurately and promptly predicting a compression quality, based on a region enabling compression quality prediction in the image.

Various example embodiments may provide a method and an apparatus for determining a compression quality of a given image and correcting the image, based on a noise removal model learned to correspond to the compression quality, in order to enhance the quality of the image by an electronic device.

An electronic device according to an example embodiment may include a display module (including a display), a memory, and a processor operatively connected to the display module and the memory, wherein the processor may be configured to operate to display an image via the display module, extract designated multiple blocks from the image in a designated scheme, estimate confidence for each of the multiple blocks, identify, based on at least the estimation of the confidence, a first block corresponding to an outlier to be excluded in quality prediction, and a second block for which quality prediction is possible, among the multiple blocks, exclude the first block among the multiple blocks from a subject of quality prediction, and classify a compression quality of the image based on at least the second block remaining after excluding the first block from among the multiple blocks.

An operation method of an electronic device according to an example embodiment may include displaying an image through a display module of the electronic device, extracting designated multiple blocks from the image in a designated scheme, estimating confidence for each of the multiple blocks, identifying, based on the estimation of the confidence, a first block corresponding to an outlier to be excluded in quality prediction, and a second block for which quality prediction is possible, among the multiple blocks, excluding the first block among the multiple blocks from a subject of quality prediction, and classifying a compression quality of the image by using the second block remaining after excluding the first block from among the multiple blocks.

To solve the problem above, various example embodiments may include a non-transitory computer-readable recording medium in which a program for executing the method by the processor.

An additional scope of applicability of the disclosure may become apparent from the detailed description below. However, various changes and modifications within the spirit and scope of the disclosure may be clearly understood by those skilled in the art, and thus it should be understood that the detailed description and a specific embodiment such as the exemplary embodiment of the disclosure are merely given as examples.

According to an electronic device and an operation method therefor according to an example embodiment, when the electronic device analyses an image, compression quality analysis is performed using a deep neural network (DNN) for a partial region rather than the entire region of the image, whereby a compression quality operation of the image can be accurately and promptly processed. According to various embodiments, when the compression quality of the image is determined (or analyzed) for image quality enhancement (e.g., image correction) by the electronic device, the compression quality of the image can be accurately and promptly predicted based on estimation of confidence in units of blocks.

According to various embodiments, an electronic device may remove, based on estimation of confidence in units of blocks for a given image, an outlier from the image, and analyze a compression quality, based on a region enabling compression quality prediction in the image, thereby more accurately analyzing the compression quality.

According to various embodiments, an electronic device can accurately determine the compression quality of a given image, and remove a compression artifact (or compression noise) of the image, based on a noise removal model learned to correspond to the determined compression quality. Accordingly, the electronic device can increase the quality of the compressed image, thereby providing a user with an image having the quality close to the original quality.

In addition, various other advantageous effects directly or indirectly identified through this document can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of drawings, the same or similar reference numerals will be used to refer to the same or a similar element.

DETAILED DESCRIPTION

Figure 1:
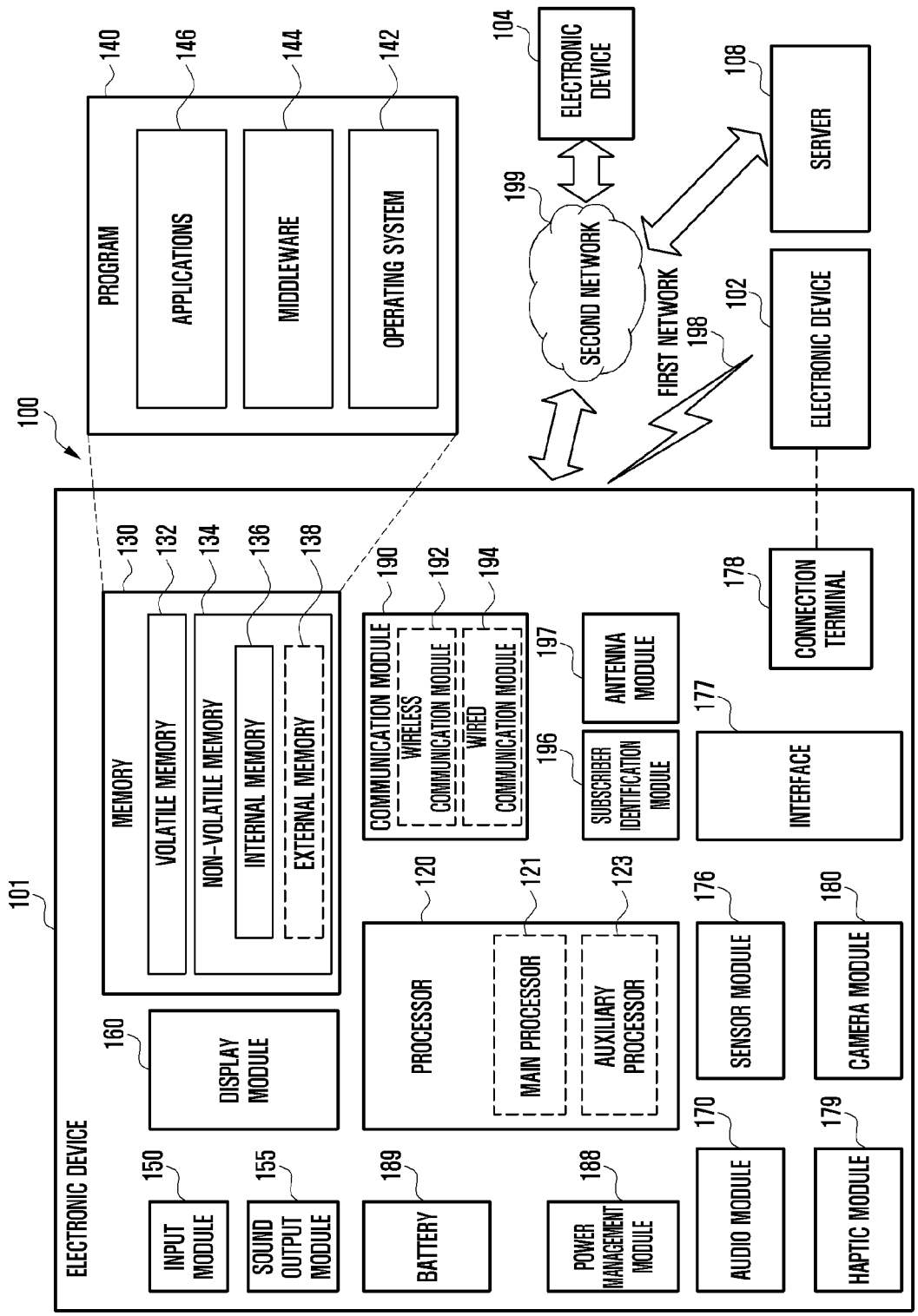
FIG. 1 is a block diagram illustrating an electronic device in a network environment according to various example embodiments.

FIG. 1 is a block diagram illustrating an example electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
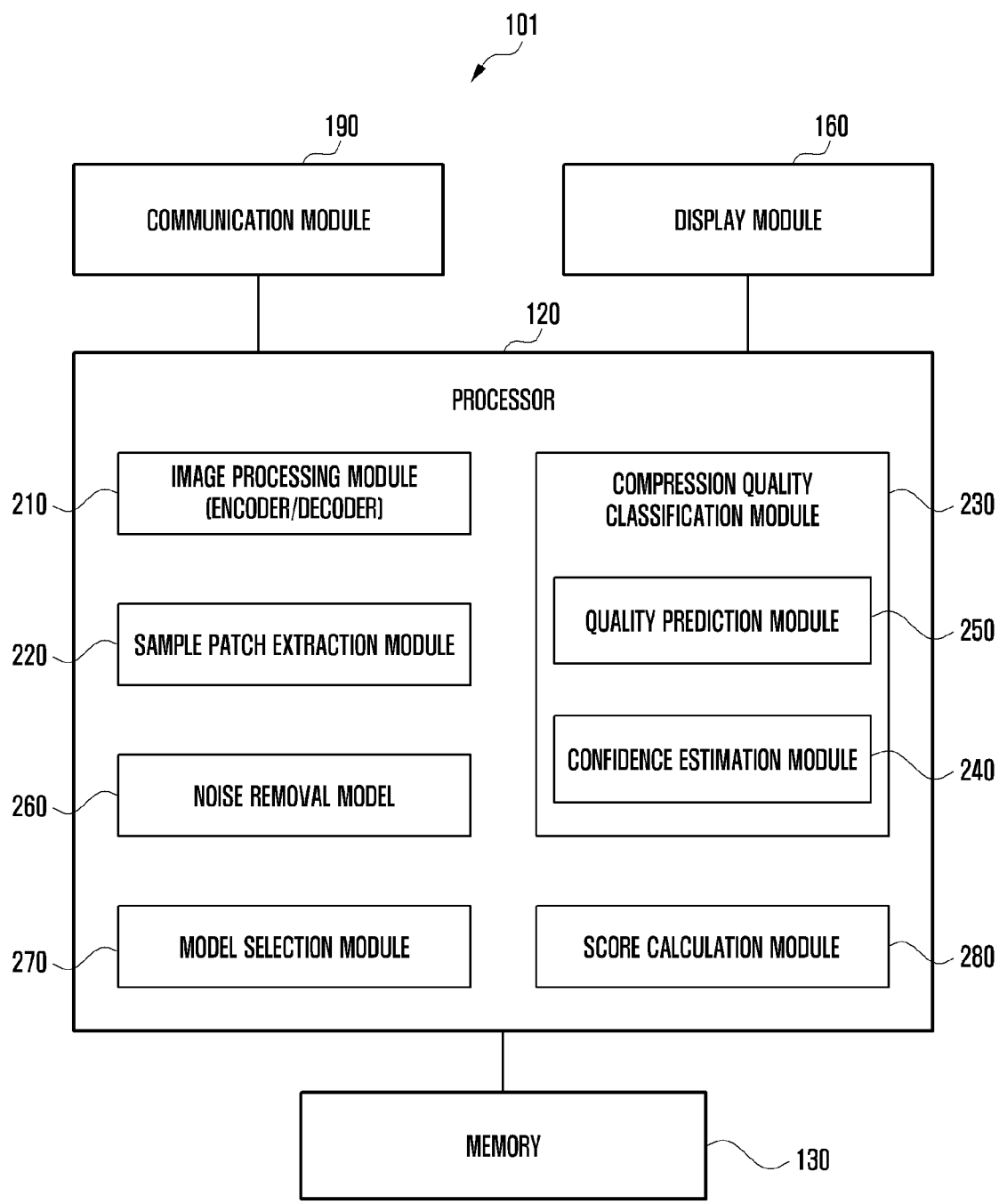
FIG. 2 schematically illustrates a configuration of an electronic device according to an example embodiment.

FIG. 2 schematically illustrates a configuration of an electronic device according to an example embodiment.

Referring to FIG. 2, an electronic device 101 according to an embodiment may include a communication module 190, a display module 160, a memory 130, and a processor 120 (including processing circuitry). In an embodiment, the processor 120 may include at least one of an image processor module 210, a sample patch extraction module 220, a compression quality classification module 230, a noise removal model 260, a module selection module 270, and/or a score calculation module 280. Each "module" herein may include circuitry.

The communication module 190 may support a legacy network (e.g., a 3G network and/or a 4G network), a 5G network, an out of band (OBB), and/or a next generation communication technology (e.g., a new radio (NR) technology). According to an embodiment, the communication module 190 may correspond to the wireless communication module 192 as illustrated in FIG. 1. According to an embodiment, the electronic device 101 may communicate with an external device (e.g., the server 108 and/or other electronic devices 102 and 104 of FIG. 1) through a network by using the communication module 190. According to an embodiment, the electronic device 101 may receive an image and/or a content (e.g., a web page) including an image from the external device through the communication module 190 (e.g., including communication circuitry).

The display module 160 (e.g., including a display) may visually provide various information to the outside (e.g., a user) of the electronic device 101. According to an embodiment, the display module 160 may include a touch detection circuit (or touch sensor) (not shown), a pressure sensor capable of measuring the strength of a touch, and/or a touch panel (e.g., a digitizer) for detecting a magnetic field type stylus pen. According to an embodiment, the display module 160 may detect measure a change in a signal (e.g., a voltage, an amount of light, resistance, an electromagnetic signal, and/or an amount of a charge) for a specific position of the display module 160, based on the touch detection circuit, the pressure sensor, and/or the touch panel, thereby detecting a touch input and/or a hovering input (or a proximity input). According to an embodiment, the display module 160 may include a liquid crystal display (LCD), an organic light emitted diode (OLED), and an active-matrix organic light emitted diode (AMOLED). In an embodiment, the display module 160 may include a flexible display.

The display module 160 may visually provide an image and/or a content including an image under the control of the processor 120. According to an embodiment, the display module 160 may provide various information (e.g., a user interface) related to image processor (e.g., image correction) corresponding to at least one displayed image.

The memory 130 may store various data used by the electronic device 101. The data may include, for example, an application (e.g., the program 140 of FIG. 1) and input data or output data for a command related to the application. According to an embodiment, the memory 130 may store instructions which, when executed, cause the processor 120 to operate. For example, the application may be stored as software (e.g., the program 140 of FIG. 1) in the memory 130, and may be executed by the processor 120. According to an embodiment, the application may be various applications (e.g., a gallery application and an image editing application) capable of providing an image by the electronic device 101.

According to an example embodiment, the memory 130 may store at least one element (or module) related to a function (or an operation) of performing block-unit confidence estimation-based compression quality prediction and processing compression image-specific image correction, which can be performed by the processor 120. For example, the memory 130 may include at least a part of the image processing module 210, the sample patch extraction module 220, the compression quality classification module 230, the noise removal model 260, the model selection module 270, and/or the score calculation module 280 of the processor 120, in the form of software (or an instruction).

The processor 120 may control a related operation for performing block-unit confidence estimation-based compression quality prediction and processing compression image-specific image correction in the electronic device 101. According to an embodiment, the processor 120 may determine a compression quality related to an image stored in the memory 130 of the electronic device 101 and/or an image received from the external device, based on confidence estimation in units of blocks, and may control the operation related to processing of image correction based on the determined compression quality.

In an embodiment, the processor 120 may predict a compression quality of an image, based on confidence estimation in units of blocks when determining (or analyzing) a compression quality of an image to enhance the quality of the image (e.g., to correct the image). In an embodiment, the processor 120 may remove an outlier from the image, based on the confidence estimation in units of blocks for the given image, and analyze the compression quality, based on a region enabling compression quality prediction in the image, for example, a partial region rather than the entire region of the image, thereby enhancing a speed of classifying the quality of the image. Here, the outlier corresponds to a special block for which proper confidence estimation is impossible (or for which compression quality prediction is difficult to be performed or is impossible), and may indicate, for example, a region to be excluded in the quality prediction.

According to an embodiment, the processor 120 may control the display module 160 to display a screen including at least one image through the display module 160. According to an embodiment, when displaying the image or while displaying the image, the processor 120 may predict (or classify) a compression quality (e.g., a compression rate) of the given image. According to an embodiment, the processor 120 may select a noise removal model 260 learned to correspond to the compression quality predicted for the given image, from among various noise removal models 260 (or denoising models, denoisers, or artifact reducers) learned (or modeled) for each of various compression qualities stored in the memory 130.

According to an embodiment, the processor 120 may process image correction based on the selected noise removal model 260 (e.g., may remove a compression artifact from the compressed image and restore the image to an image having an original quality), and may process the corrected image according to a designated operation. For example, the processor 120 may operate to display the corrected image through the display module 160, store the same in the memory 130, or transmit the same to the outside (e.g., the server or other electronic devices).

According to an embodiment, the processor 120 may include at least one element (or module) for performing block-unit confidence estimation-based compression quality prediction and processing compression quality-specific image correction. For example, the processor 120 may include at least one of the image processing module 210 (e.g., including imaging processing circuitry), the sample patch extraction module 220, the compression quality classification module 230, the noise removal model 260, the model selection module 270, and/or the score calculation module 280. Each module herein may include circuitry.

According to an embodiment, at least a part of the image processing module 210, the sample patch extraction module 220, the compression quality classification module 230, the noise removal model 260, the model selection module 270, and/or the score calculation module 280 may be included in the processor 120 as a hardware module (e.g., circuitry), and/or may be implemented as software including one or more instructions which can be executed by the processor 120. For example, operations performed by the processor 120 may be stored in the memory 130, and may be executed by instructions which, when executed, cause the processor 120 to operate.

The image processor module 210, including imaging processing circuitry, may include an image encoder and an image decoder. According to an embodiment, the image processing module 210 may process encoding of the image through the image encoder. For example, the image processing module 210 may compress the image into a file having a designated compression rate (or compression level) and a designed format (e.g., mpeg, jpeg, gif, and/or png) through the image encoding by using the image encoder. According to an embodiment, the image processing module 210 may process decoding of the image compressed through the designated encoding, through the image decoder. For example, the image processing module 210 may decompress the image file compressed through the encoding and restore (or reconstruct) the image by using the image decoder.

The sample patch extraction module 220 (e.g., a sample patch extractor) may indicate a module for extracting a predetermined number (e.g., M) or more patches (e.g., 16×16 patch) to classify a compression quality of an image. For example, the sample patch extraction module 220 may extract M (e.g., about 256) samples (e.g., about 256 16×16 patches) from the given image, and the processor 120 (e.g., the compression quality classification module 230) may operate to determine a final quality (Q) of the image by performing compression quality classification (e.g., quality prediction and confidence estimation) for at least a part of the extracted 256 16×16 patches.

According to an embodiment, when extracting a patch, the sample patch extraction module 220 may uniformly or randomly extract multiple patches according to a designated scheme (e.g., a uniform scheme or a random scheme). For example, the processor 120 may perform analysis through a partial region (e.g., a patch unit) rather than the entire region in the given image. For example, the processor 120 may perform analysis based on a designated region of interest (ROI) rather than the entire region in the image.

In an embodiment, the sample patch extraction module 220 may extract (e.g., uniform extraction or random extraction) multiple regions from the given image in units of patches. In an embodiment, a patch may mean a minimum or reduced image unit enabling identification of a compression quality of an image. For example, a compression method for image compression is performed by dividing an image in units of 8×8 blocks and compressing the same, the patch may be configured as a 10×10 block as well as an 8×8 block, wherein the 10×10 block is a larger region including a relationship around the 8×8 block. According to an embodiment, to include the center of a neighboring block of the 8×8 block, about four pixels of the neighboring block may be added and the size of the patch may for example be defined as a 16×16-size region.

The compression quality classification module 230 (e.g., a compression quality classifier) may indicate a module for dividing a compression quality into a predetermined number of stages (e.g., N stages) (e.g., 13 stages, 16 stages, 50 stages, or 100 stages). For example, the compression quality classification module 230 may classify N compression qualities corresponding to N compression qualities (or compression rates or compression levels) related to the image. According to an embodiment, the compression quality classification module 230 may configure various stages (e.g., 13 stages, 16 stages, 50 stages, or 100 stages), based on a service or an application.

For example, the compression quality classification module 230 may configure X stages (e.g., 16 stages) for a first application (e.g., an image editing application), and configure Y stages (e.g., 100 stages) for a second application (e.g., a gallery application).

For example, the compression quality classification module 230 may configure a quality option of an image encoder with various N classes and prepare compressed images having N qualities. For example, a library application implemented with JPEG format encoding may provide encoding qualities with, for example, 100 compression stages from 1 to 100, and the image editing application may provide encoding qualities with, for example, 13 compression stages from 1 to 13. For example, an input of the compression quality classification module 230 may be, for example, an image having a 16×16 patch size. According to an embodiment, a compression quality classification operation of the compression quality classification module 230 will be described with reference to the drawings below.

According to an example embodiment, the compression quality classification module 230 may predict a compression quality of the given image, based on confidence estimation for a patch extracted by the sample patch extraction module 220. For example, the compression quality classification module 230 may include a confidence estimation module 240 (e.g., a confidence estimator) operable to estimate confidence in units of blocks (e.g., in units of patches) in the given image, and a quality prediction module 250 (e.g., a quality predictor) operable to predict a compression quality in the given image.

The confidence estimation module 240 may estimate confidence of an input patch (e.g., a patch extracted by the sample patch extraction module 220). According to an embodiment, the confidence estimation module 240 may estimate confidence, based on a specific region of interest (ROI) rather than the entire region of the image. For example, the confidence estimation module 240 may designate an estimation range in the image and estimate the confidence.

According to an example embodiment, the confidence estimation module 240 may perform confidence estimation for multiple (e.g., designated M) patches extracted from the image. In an embodiment, the confidence estimation module 240 may estimate the confidence of the extracted patches, based on various confidence estimation schemes, so as to estimate at least one patch (e.g., K patches) corresponding to an outlier having a confidence value equal to or smaller than a designated threshold value. According to an embodiment, while the quality prediction module 250 is learned, the confidence estimation module 240 may simultaneously and continuously measure a quality prediction performance of the input patch, and may be learned together with the quality prediction module 250 so that the quality prediction module 250 can statistically identify a phenomenon in which the quality measurement performance of a specific type of input patch decreases.

The quality prediction module 250 may measure the quality of the input patch. According to an embodiment, the quality prediction module 250 may exclude patches (e.g., K patches) corresponding to an outlier estimated based on the confidence estimation module 240, from a subject of quality prediction, among multiple (e.g., designated M) patches extracted from the image, and may determine a compression quality by using a patch (e.g., a region enabling compression quality prediction) remaining after excluding the patch of the outlier from the input patch.

According to an example embodiment, the quality prediction module 250 may exclude at least one patch (e.g., K patches) corresponding to the outlier having a confidence value equal to or smaller than a designated threshold value, from a mean operation of the patch-specific compression quality, may analyze the compression quality, based on the remaining patches (e.g., (M-K) patches) each having a confidence value greater than the designated threshold value (e.g., may operate a mean of compression qualities for the respective remaining patches), and may classify (or determine) a compression quality (e.g., a final quality (Q) of the image).

For example, the quality prediction module 250 may remove the outlier from the image, and combine prediction results only acquired from an image patch enabling meaningful compression quality prediction, thereby more precisely and promptly predicting the quality of the image. According to an embodiment, when the quality prediction module 250 determines that all of the extracted multiple (e.g., designated M) patches are outliers, the quality prediction module may also operate to adaptively predict the quality by extracting multiple (e.g., designated M) patches again from another region.

The noise removal model 260 may include a denoising model, a denoiser, or an artifact reducer. According to an embodiment, the noise removal model 260 may indicate, for example, a model to be used as a post-processing filter of the image processing module 210 (e.g., an image decoder). According to an embodiment, the noise removal model 260 may include multiple (e.g., n, where n is a natural number equal to or greater than 2) for each of various compression qualities (or compression rates or compression levels) related to the image. According to an example embodiment, the noise removal model 260 uses various compressed images corresponding to various compression qualities in the electronic device 101, and multiple noise removal models 260 corresponding the various compression qualities, respectively, are learned and stored in the memory 130.

The model selection module 270 may select an optimal noise removal model 260 to apply image correction (e.g., compression artifact removal based on a compression quality) of the given image, based on one or more designated criteria. According to an embodiment, when selecting a noise removal model 260, the model selection module 270 may select a noise removal model 260 learned to correspond to a compression quality based on the confidence estimation.

According to an example embodiment, when selecting a noise removal model 260, the model selection module 270 may also consider, in addition to the compression quality, at least one of a user's intention (or preference or taste), a type of service or application providing an image, and/or a physical size (e.g., a screen size of the display module 160) of the display module 160 on which the image is actually displayed, so as to select a noise removal module 260 for applying (or configuring) different correction strengths.

The score calculation module 280 may calculate a mean or a median of estimated result of the input patch, based on the confidence, and generate one output (e.g., number). According to an embodiment, the score calculation module 280 may be learned to output quality information (e.g., number) of a compression quality (e.g., a final quality (Q)) of an image. According to an embodiment, the score calculation module 280 may learn quality information of the compression quality, based on pre-defined score calculation criteria or range (e.g., a mean or a median).

Various embodiments may be implemented in a recording medium readable by a computer or a device similar thereto, by using software, hardware, or a combination thereof. According to hardware implementation, operations described in various embodiments may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for perform other functions. Each processor and controller herein may include processing circuitry.

In various embodiments, a recoding medium may include a non-transitory computer-readable recording medium in which a program for executing operations of displaying a screen including an image through the display module 160, determine a compression quality of the image, selecting a noise removal model learned to correspond to the determined compression quality, processing image correction, based on the selected noise removal model, and processing the corrected image according to a designated operation (e.g., a displaying, storing, and/or transmitting operation) is recorded.

An electronic device 101 according to an example embodiment may include a display module (e.g., the display module 160 of FIG. 1 or FIG. 2), a memory (e.g., the memory 130 of FIG. 1 or FIG. 2), and a processor (e.g., the processor 120 of FIG. 1 or FIG. 2) operatively connected to the display module and the memory, wherein the processor operates to display an image through the display module, extract designated multiple blocks from the image in a designated scheme, estimate confidence for each of the multiple blocks, identify, based on at least the estimation of the confidence, a first block corresponding to an outlier to be excluded in quality prediction, and a second block for which quality prediction is possible, among the multiple blocks, exclude the first block among the multiple blocks from a subject of quality prediction, and classify a compression quality of the image by using the second block remaining after excluding the first block from among the multiple blocks.

According to an example embodiment, the image may correspond to a compression image compressed at a designated compression quality.

According to an example embodiment, the processor may operate to estimate at least one first block corresponding to an outlier having a value equal to or smaller than a designated threshold value, based on the estimation of the confidence in units of blocks, for the extracted multiple blocks, to exclude the at least one first block in a mean/median operation for compression quality classification, perform the mean/median operation for the compression quality classification, based on at least one second block having a value greater than a designated threshold value, and classify a result of the mean/median operation as a compression quality of the image.

According to an example embodiment, wherein the processor may operate to select a noise removal model learned to correspond to a compression quality classified for the image, process quality enhancement for the image, based on the selected noise removal model, and process the enhanced image, based on a designated operation.

According to an example embodiment, the processor may operate to store, in the memory, multiple noise removal models pre-learned for respective various compression qualities, and select a noise removal model learned to correspond to the classification of the compression quality of the image from among the multiple noise removal models.

According to an example embodiment, the processor may operate to process the enhanced image according to at least one designated operation among displaying through the display module, storing in the memory, or transmission to the outside.

According to an example embodiment, the processor may operate to receive a user input of requesting information related to an image quality of the image, and control, based on the reception of the user input, the display module 160 to display correction information of the image, based on the image.

According to an example embodiment, the processor may operate to identify at least one block having a compression quality corresponding to a representative quality of the image, based on the reception of the user input, and provide a designated notification object and detailed information on image correction, based on the identified block.

According to an example embodiment, the processor may operate to identify a block having high confidence from the image, to measure a quality and confidence for the identified block, compare each of block-specific compression qualities according to the measured quality and confidence with a representative quality of the image, perform clustering of blocks each having a compression quality corresponding to the representative quality, among the block-specific compression qualities, and having relatively high confidence compared to other blocks, provide the designated notification object, based on a part corresponding to the clustered blocks in the image, and control the display module to display detailed information including a total score of the image correction and a description of the classification, together with the notification object.

According to an example embodiment, the processor may operate to, when performing second compression of the image, remove an artifact generated during first compression of the image and then performing the second compression.

According to an example embodiment, the processor may operate to receive a user input for compression of the image, remove, based on the reception of the user input, the artifact generated during the first compression, based on a noise removal model corresponding to a first compression quality during the first compression of the image, determine a second compression quality for the second compression, based on the first compression quality related to the first compression, and perform the second compression of the image, based on the second compression quality.

According to an example embodiment, the processor may operate to determine the second compression quality to correspond to the first compression quality.

According to an example embodiment, the processor may include a confidence estimation module and a quality prediction model for classification of the compression quality, wherein while learning the quality prediction module, the processor operates to also learn the confidence estimation module together.

According to an example embodiment, the processor may operate to classify the compression quality of the image by using a learning model (or a trained model) learned using an artificial intelligence algorithm.

Hereinafter, a detailed description of an operation method of the electronic device 101 of various embodiments will be made. The operation performed by the electronic device, described below, may be executed by a processor 120 including various processing circuitry and/or executable program elements of the electronic device 101. According to an embodiment, the operations performed by the electronic device 101 may be stored in the memory 130 and may be executed by instructions which, when executed, cause the processor 120 to operate.

Figure 3:
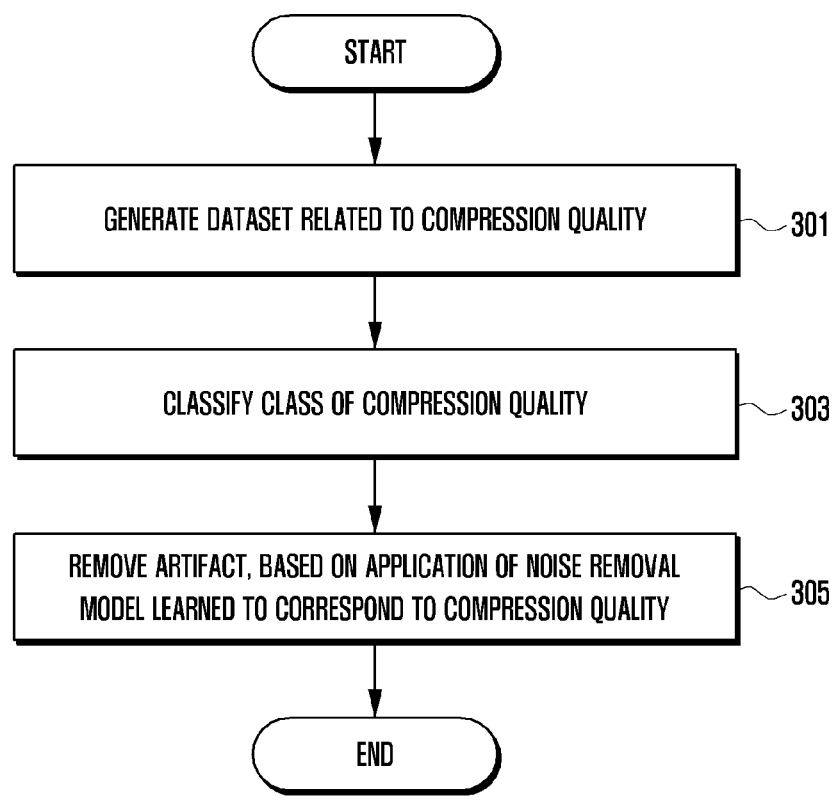
FIG. 3 is a flowchart illustrating an example of an operation of learning, classification, and removal for image correction in an electronic device according to an example embodiment.

FIG. 3 is a flowchart illustrating an example of an operation of learning, classification, and removal for image correction in an electronic device according to an example embodiment.

Referring to FIG. 3, in operation 301, the processor 120 of the electronic device 101 may generate a dataset including compression qualities having multiple classes. According to an embodiment, the processor 120 may generate a dataset including compression qualities having N classes. For example, in order to generate a machine learning module by the electronic device 101, the dataset of an image may be required.

In an embodiment, the dataset of the image may be prepared using, for example, the image processing module 210 (e.g., the image encoder) of FIG. 2. For example, the processor 120 may configure various quality options of an image encoder with N classes to prepare a compressed image having N qualities. For example, a library application in which JPEG format encoding is implemented may provide encoding qualities with, for example, 100 compression stages from 1 to 100, and an image editing application may provide encoding qualities with, for example, 13 compression stages from 1 to 13.

According to an embodiment, the processor 120 may learn, for example, the compression quality classification module 230 (e.g., the confidence estimation module 240 and the quality prediction module 250) of FIG. 2, based on the dataset. According to an embodiment, the processor 120 may configure an image compressed with various qualities as "input X", and configure a quality used when generating each compressed image as "ground truth output Y" (e.g., a label or a cover).

According to an embodiment, the processor 120 may operate to, while learning the quality prediction module 250, also learn the confidence estimation module 240 which simultaneously and continuously measures a quality prediction performance of an input patch and allows the corresponding quality prediction module 250 to statistically identify a phenomenon in which the quality measurement performance of a specific type of input patch decreases. For example, the processor 120 may learn not only a method for classifying a corresponding compression quality from learning data but also a method for estimating the confidence corresponding thereto. Based on this, the processor 120 may apply confidence estimation in accordance with the corresponding compression quality when a specific image is given.

According to an embodiment, the processor 120 may learn, for example, the noise removal model 260 (e.g., an artifact reducer) of FIG. 2. According to an embodiment, the processor 120 may configure an image compressed with various qualities as "input X" and configure an original image as "ground truth output Y". According to an embodiment, the noise removal model 260 may indicate an image, the label of which is not an integer, unlike the compression quality classification module 230.

In operation 303, the processor 120 may classify a class of a compression quality. According to an example embodiment, the processor 120 may perform learning for classifying a class of a compression quality. According to an embodiment, the processor 120 may use various machine learning methods as a method for classifying the class of the compression quality. For example, the compression quality classification module 230 (e.g., the quality prediction module 250) may be implemented through a convolutional neural network (CNN). For example, the processor 120 may train a CNN model with data obtained by decoding various compression image qualities on the dataset generated in operation 301 by using the image processing module 210 (e.g., the image decoder), so as to predict, when an image is given on the electronic device 101, a compression quality of the corresponding image.

The machine learning method according to an embodiment is not limited to the CNN model, and various machine learning methods which can be used for classification and enhancement of the compression quality may be used. For example, the machine learning method may include various machine learning methods such as an unsupervised learning-based deep belief network (DBN) and/or deep autoencoder, a convolutional neural network (CNN) for processing two-dimensional data such as an image, and/or a recurrent neural network (RNN) for processing time-series data.

According to an example embodiment, the processor 120 may predict (infer) a compression quality of an image. According to an embodiment, when performing class classification of the compression quality in the electronic device, the processor 120 may extract (e.g., uniform extraction or random extraction), for example, about 256 16×16 patches by using, for example, the sample patch extraction module 220 of FIG. 2, instead of checking all patches of the image, and predict the compression quality (e.g., a final quality (Q)) of the image, based on each of the extracted 256 patches.

According to an example embodiment, when predicting the final quality (Q) based on extracted regions, the processor 120 may estimate confidence of each of the extracted regions, exclude an outlier having a value of the confidence (or a score) equal to or smaller than a designated threshold value from a mean/median operation of the compression quality, and predict the final quality (Q). According to various embodiments, the processor 120 may analyze a part of the image rather than the entire image to dramatically enhance a classification speed. According to an embodiment, a description related to a compression quality classification operation will be made with reference to the drawings below.

In operation 305, the processor 120 may remove artifacts, based on application of a noise removal model learned to correspond to the compression quality. According to an embodiment, the processor 120 may apply, to the given image, an enhancement strength (denoising strength) learned to correspond to the corresponding compression quality, so as to remove the artifacts. According to an embodiment, the processor 120 may perform learning for determining a noise removal model corresponding to the compression quality. According to an embodiment, the processor 120 may generate, for example, N noise removal models 260, wherein N is identical to the number of compression quality classifications.

According to an example embodiment, to reduce the number of noise removal models 260, the processor 120 may perform quantization to, for example, a number smaller than N, and generate the noise removal model 260. For example, the processor 120 may perform quantization to, for example, about 8 qualities (e.g., compression qualities 20, 30, 40, 50, 60, 70, 80, and 90) among about 100 compression qualities.

According to an example embodiment, the processor 120 may generate a learning module so as to allow the compressed image generated through the quantization to be corrected to an original image in units of 8×8 patches. According to an embodiment, the processor 120 may configure an input size as a patch having a 16×16 pixel size, so as to consider at least partial area of surround blocks together. For example, the processor 120 may prevent or reduce surround blocks and the texture and/or color of a specific block from being dramatically changed.

According to an example embodiment, the processor 120 may determine a proper noise removal model 260, based on the quality (e.g., the final quality (Q)) predicted through the compression quality classification module 230, and apply the determined noise removal model 260 to image correction, thereby removing compression artifacts according to loss compression of the image.

Figure 4:
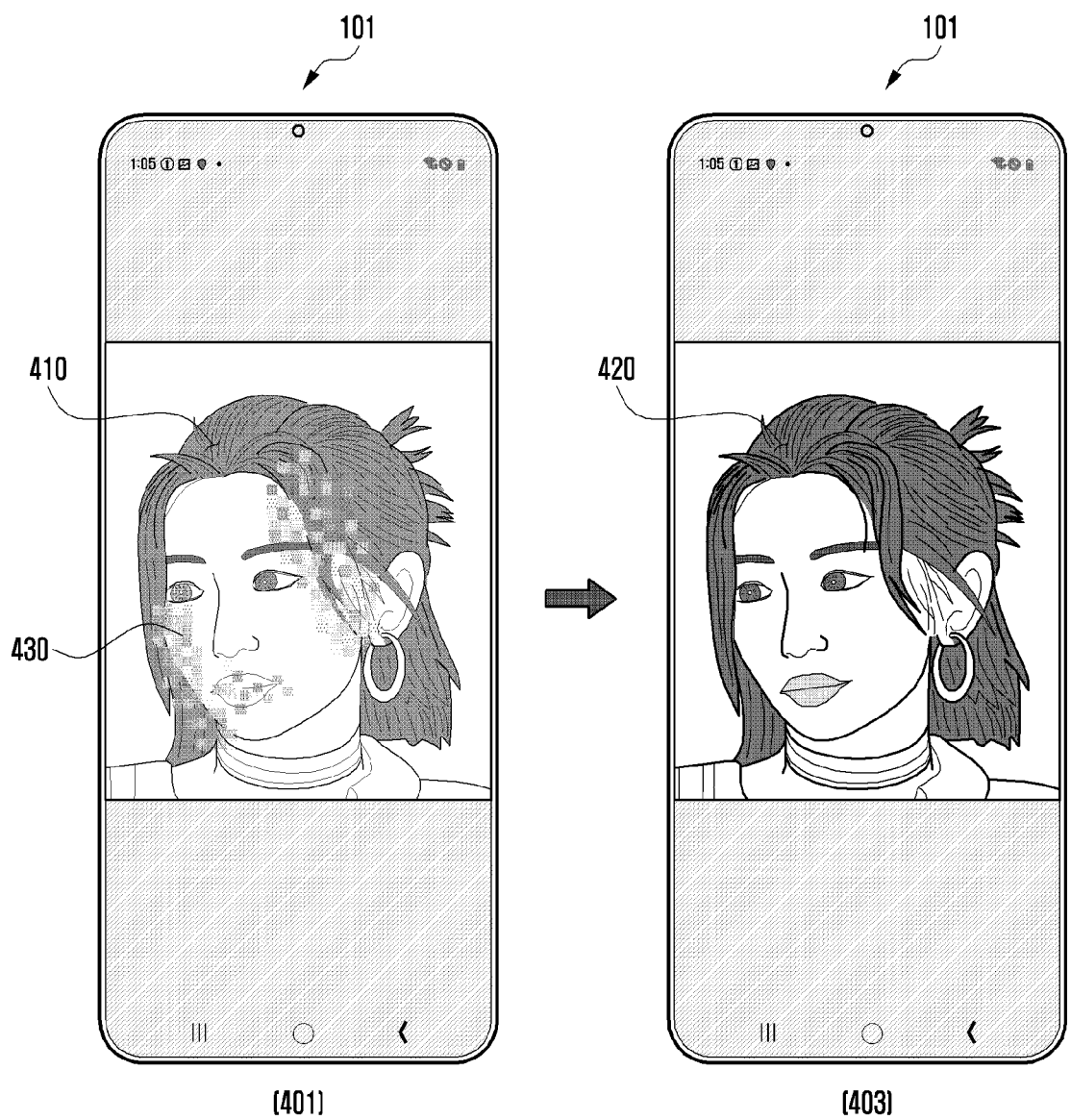
FIG. 4 illustrates an example of image correction in an electronic device according to an example embodiment.

FIG. 4 illustrates an example of image correction in an electronic device according to an example embodiment.

In the example of FIG. 4, example screen <401> may indicate an example in which a compressed image 410 (e.g., a given image) before image correction according to a compression quality is provided. In the example of FIG. 4, example screen <403> may indicate an example in which a compressed image 420 (e.g., a restored image) after image correction according to a compression quality is provided.

According to an example embodiment, in the example of FIG. 4, example screen <401> may indicate an example in which a compression quality of a given image (e.g., a compressed image 410 compressed with a designated compressed quality) is in, for example, a JPEG quality level (e.g., about 80). According to an embodiment, in the example of FIG. 4, example screen <403> may indicate an example in which the electronic device 101 classifies (or predicts) a JPEG quality level (e.g., about 80) in the given image 410 and applies (e.g., image correction) an enhancement algorithm (e.g., a noise removal model) learned to correspond to the classified compression quality (e.g., a quality level: about 80).

According to an embodiment, in the electronic device 101, most of the image may be compressed with a predetermined compression quality (or a compression rate) and provided. In the compressed image, unique artifacts (e.g., element 430 part in example screen <401>) may be generated according to the compression quality, as illustrated in example screen <401>. For example, to reduce the compression quality (e.g., bit rate), various methods such as various samplings (e.g., chroma subsampling), block sizes, and/or quantization (e.g., discrete cosine transform (DCT) and coefficient quantization) may be used, and the image may be additionally compressed using more various compression quality adjustment methods (e.g., a bit rate adjustment method) according to a compression codec.

According to an example embodiment, the electronic device 101 may learn (or train) a pattern of unique artifacts (or noise) indicated in the corresponding compression quality in learning data (e.g., various compression quality-specific images) including various compression qualities, and learn multiple models (e.g., noise removal models) for removing the artifacts through a deep neural network. In an embodiment, the deep neural network may indicate an artificial neural network (ANN) including multiple hidden layers between an input layer and an output layer.

According to an example embodiment, the deep neural network may learn various non-linear relationships including multiple hidden layers, and is utilized as a core model of deep learning. According to an embodiment, the deep neural network may include a deep belief network (DBN), a deep autoencoder, a convolutional neural network (CNN), and/or a recurrent neural network (RNN) according to an algorithm. According to an embodiment, the electronic device 101 may receive a model (e.g., a noise removal model) learned (or trained) in advance for the pattern of artifacts (or noise) transferred from another electronic device, or may acquire (e.g., download) the same from the server.

In various example embodiments, a noise removal model optimized for each of various compression qualities may be matched, and a noise removal model corresponding to the compression quality may be applied, so that artifacts (or noise) (e.g., element 430) can be removed. According to an embodiment, the electronic device 101 may classify an artifact according to a compression quality through learning data, automatically analyze a pattern of artifacts, and remove a unique artifact corresponding to the corresponding compression quality.

According to an example embodiment, the electronic device 101 may identify a compression quality of the given image (e.g., the compressed image 410 of example screen <401>), apply a noise removal model learned according to the artifact (or noise) of the corresponding compression quality, and provide a user with an image (e.g., the restored image 420 of example screen <403>) from which the artifact has been removed.

Figure 5:
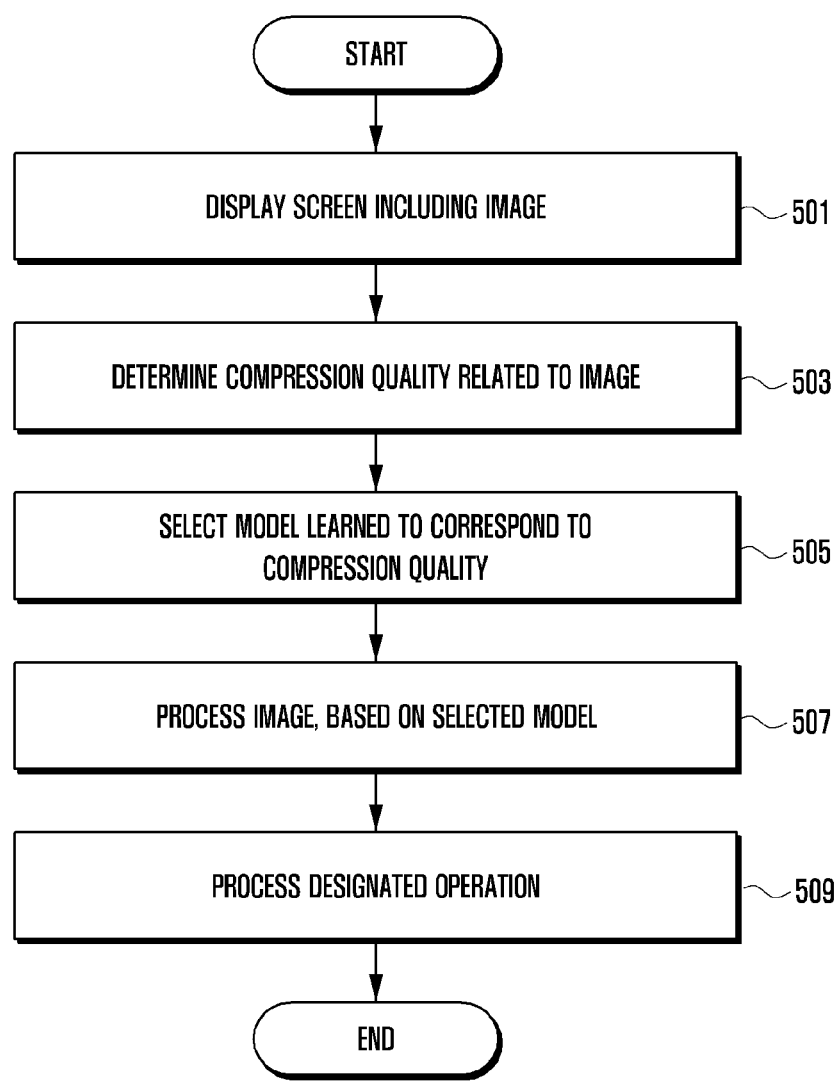
FIG. 5 is a flowchart illustrating an operation method of an electronic device according to an example embodiment.

FIG. 5 is a flowchart illustrating an operation method of an electronic device according to an example embodiment.

Referring to FIG. 5, in operation 501, the processor 120 of the electronic device 101 may display a screen including an image. According to an embodiment, the processor 120 may visually provide an image and/or a content including an image through the display module 160. According to an embodiment, the processor 120 may control the display module 160 to display a screen including an image stored in the memory 130 of the electronic device 101 and/or an image received from an external device, based on a user input. According to an embodiment, the image may indicate a compressed image compressed with a designated compression quality (e.g., compression rate or compression level).

In operation 503, the processor 120 may determine (or classify) a compression quality (or compression rate or compression level) of a given image. According to an embodiment, when determining the compression quality, the processor 120 may extract designated M (e.g., about 256) patches in a designated scheme (e.g., a uniform scheme or a random scheme) in a partial region rather than the entire region of the given image, for example, in units of patches (e.g., 8×8 pixel, 16×16 pixel, or 64×64 pixel). For example, the image compression may include dividing an image into small blocks and integrally applying a compression mechanism (e.g., chroma subsampling, DCT, quantization) of the same compression quality level to all blocks.

For example, to reduce the compression quality (e.g., bit rate), various compression mechanisms such as various samplings (e.g., chroma subsampling), block sizes, and/or quantization (e.g., discrete cosine transform (DCT) and coefficient quantization) may be used, and the compressed image may be additionally compressed using more various compression quality adjustment methods (e.g., a bit rate adjustment method) according to a compression codec. The compressed image may be compressed with a predetermined compression quality (or compression rate) to all blocks (e.g., by applying compression mechanisms at similar levels) to satisfy a target compression quality for the entire image. Accordingly, even though at least a partial block is only identified from the image, the entire compression quality of the image may be predicted.

According to an example embodiment, when determining the compression quality of the image, the processor 120 may predict the compression quality of the image, based on confidence estimation in units of blocks (e.g., in units of patches). For example, for the given image, the processor 120 may remove an outlier from the image, based on confidence estimation in units of blocks, and analyze the compression quality, based on a region enabling compression quality prediction in the image. For example, among input patches, the processor 120 may exclude a patch corresponding to the outlier from a subject of quality prediction through the confidence estimation, and may determine the compression quality by using a patch (e.g., a region enabling compression quality prediction) remaining after excluding the patch of the outlier from the input patches.

According to an example embodiment, when determining the compression quality, the processor 120 may extract multiple (e.g., designated M) patches according to a designated scheme (e.g., a uniform scheme or a random scheme) from the given image, and perform confidence estimation to the extracted patches. For example, the processor 120 may estimate confidence of the extracted patches, based on various confidence estimation schemes, and may exclude at least one patch (e.g., K patches) corresponding to an outlier having a value of confidence equal to or smaller than a designated threshold value, in a mean/median operation of patch-specific compression qualities. The processor 120 may analyze (e.g., operate a mean/median of compression qualities of the remaining patches) a compression quality, based on the remaining patches (e.g., (M-K) patches) each having a value of confidence greater than a designated threshold value, so as to classify (or determine) the compression quality (e.g., the final quality (Q) of the image). For example, the processor may remove the outlier from the image, and combine prediction results only acquired from an image patch enabling meaningful compression quality prediction, thereby more precisely and promptly predicting the quality of the image.

According to an example embodiment, the processor 120 may determine the compression quality by classifying, learning, and predicting the compressed image in units of patches (e.g., an 8×8 patch unit, a 16×16 patch unit, or a 64×64 patch unit). For example, image compression may be performed in units of patches, and thus the quality can be classified in units of 8×8 patches, 16×16 patches, or for example maximum 64×64 patches (e.g., in case of HEVC). Accordingly, the processor 120 may focus on the corresponding patch that is a unit in which the compression is performed, thereby preventing or reducing a calculation error which may be caused by an overall image characteristic. In addition, the size of an input image of an operation for determining the compression quality is small, and thus the processor 120 may avoid an operation of broadening unnecessary receptive fields by using the existing pooling region and decreasing the accuracy.

According to an example embodiment, a region (e.g., an outlier) in which no accurate compression rate is reflected due to the characteristic of the image (e.g., a region having similar characteristics regardless of whether compression is performed, such as a region in black in the image and/or a region having a low frequency component) may be generated, and thus the processor 120 may remove, when determining the compression quality, the outlier from the image by considering the region. For example, when calculating a mean/median value of the respective compression qualities (or scores) of the extracted regions, the processor 120 may analyze confidence of the extracted regions to exclude the outlier having a value of confidence equal to or smaller than a designated threshold value, in the mean/median value calculation.

In operation 505, the processor 120 may select a model (e.g., a noise removal model or a denoising model) learned to correspond to the corresponding quality. For example, the processor 120 may predict the compression quality in advance and use the noise removal model 260 learned according to the corresponding compression quality in the electronic device 101.

According to an example embodiment, the processor 120 may select a noise removal model 260 learned to correspond to the compression quality of the image from among multiple noise removal models 260 pre-learned for each of various compression qualities in the memory 130. According to an embodiment, when classification is made as a first compression quality for the given image, the processor 120 may select a first noise removal model corresponding to the classification of the first compression quality. According to an embodiment, when classification is made as a second compression quality, the processor 120 may select a second noise removal model corresponding to the second compression quality. According to an embodiment, when classification is made as a third compression quality, the processor 120 may select a third noise removal model corresponding to the third compression quality.

According to an example embodiment, when selecting a noise removal model learned to correspond to the compression quality, the processor 120 may also select a noise removal model by considering at least one of a user's intention (or preference or taste), a type of an application or service providing an image, and/or a physical size (e.g., a screen size of the display module 160) of the display module 160 on which an actual image is displayed.

In operation 507, the processor 120 may perform image processing based on a selected model. According to an embodiment, the processor 120 may process image correction by using a selected noise removal model, based on the compression quality of the image, among multiple noise removal models 260. According to an embodiment, the processor 120 may remove a compression artifact (or noise) from the given image according to a correction strength corresponding to the selected noise removal model and restore the given image (e.g., compressed image) to an original image before the compression.

In operation 509, the processor 120 may process a designated operation. According to an embodiment, the processor 120 may control the display module 160 to display the corrected image. According to an embodiment, the processor 120 may control the display module 160 to display a corrected state, based on the noise removal model corresponding to the given image. In an embodiment, the designated operation in operation 509 may include transmitting the corrected image to the outside, or storing the corrected image in the memory 130 of the electronic device 101.

Figure 6:
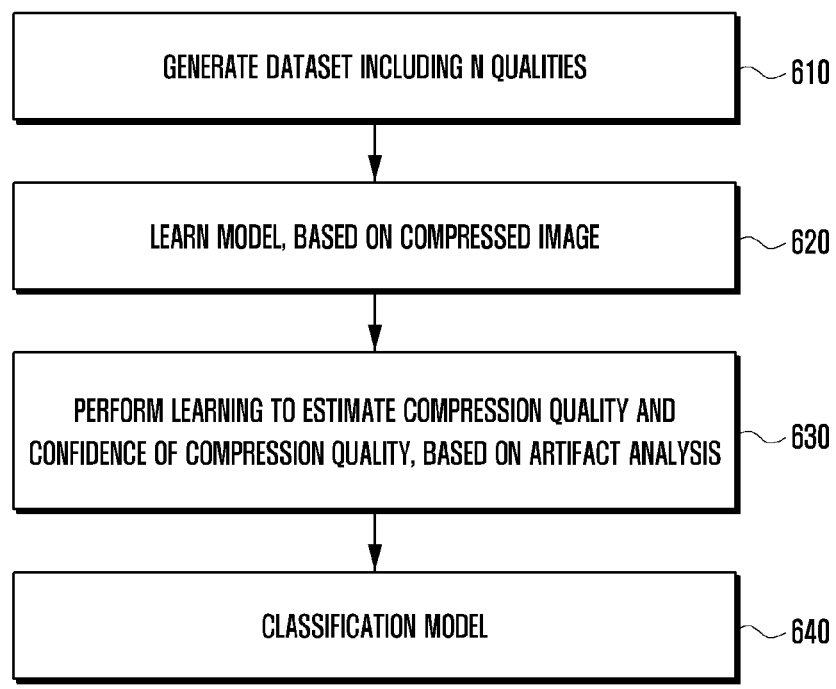
FIG. 6 illustrates an example of an operation of learning in an electronic device according to an example embodiment.

FIG. 6 illustrates an example of an operation of learning in an electronic device according to an example embodiment.

According to an embodiment, FIG. 6 shows an example of a pre-learning operation performed by the electronic device 101. According to an embodiment, the pre-learning operation performed by the electronic device 101 as illustrated in FIG. 6 may be performed in, for example, another environment (e.g., a developer work station and/or cloud environment), and downloaded by the electronic device 101. According to an embodiment, with respect to a model (e.g., a classification model) according to a pre-learning operation of the electronic device 101, a pre-learned (or trained) model may be acquired (received or downloaded) from another electronic device or a server.

Referring to FIG. 6, in block 610, the processor 120 of the electronic device 101 may generate a dataset including N qualities. According to an embodiment, to generate a dataset including multiple (e.g., N) classes of compression qualities, the processor 120 may perform subsampling, transform, and/or coefficient quantization of a channel of images into N stages.

In block 620, the processor 120 may learn a model, based on a compressed image. According to an embodiment, the processor 120 may perform learning (e.g., block 630) of the compressed image. According to an embodiment, learning may indicate, as illustrated in block 630, learning a compression quality and confidence of the compression quality by analyzing artifacts of a patch, the corresponding noise removal model of which is transformed.

In block 640, the processor 120 may generate one classification model according to learning (block 630). According to an embodiment, the processor 120 may use a classification model generated based on the learning, for an operation of predicting a compression quality in FIG. 7 described below.

Figure 7:
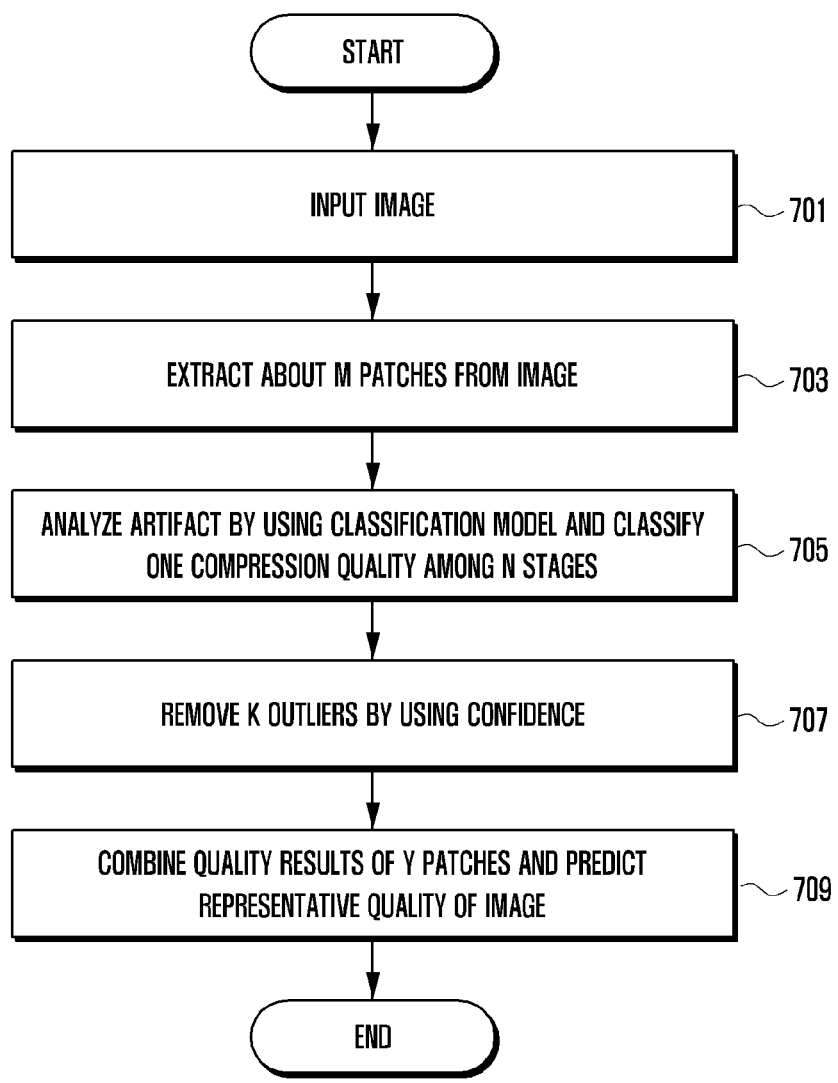
FIG. 7 is a flowchart illustrating an operation method of predicting a compression quality by an electronic device according to an example embodiment.

FIG. 7 is a flowchart illustrating an operation method of predicting a compression quality by an electronic device according to an example embodiment.

According to an embodiment, FIG. 7 may indicate an example of an operation of classifying a compression quality, performed by the electronic device 101.

Referring to FIG. 7, in operation 701, the processor 120 of the electronic device 101 may input an image. According to an embodiment, the processor 120 may input an image having a compression quality to be enhanced, as an input subjected to learning.

In operation 703, the processor 120 may extract about M patches from the image at uniform intervals. According to an embodiment, the processor 120 may uniformly or randomly extract, for example, about 256 16×16 patches, from the input image.

In operation 705, the processor 120 may analyze artifacts by using a classification model and classify one compression quality among N stages (e.g., information (e.g., number) on a quality according to a characteristic of an artifact). According to an embodiment, the processor 120 may analyze a corresponding artifact, based on the classification model generated according to the learning (e.g., block 630) in FIG. 6, so as to classify one of N stages of compression qualities.

In operation 707, the processor 120 may remove about K outliers by using confidence. According to an embodiment, the processor 120 may estimate confidence in units of patches and remove an outlier from the image, based on the confidence estimation in units of patches. For example, the processor 120 may exclude a patch corresponding to an outlier having a value of confidence equal to or smaller than a designated threshold value from a subject of quality prediction. An example thereof is illustrated in FIG. 8.

In operation 709, the processor 120 may combine quality results of Y (e.g., Y=M−K) patches and predict a representative quality (e.g., final quality (Q)) of the image. According to an embodiment, the processor 120 may remove at least one patch (e.g., K patches) corresponding to the outlier from patches (e.g., M patches) extracted from the image, and predict (or derive) a representative quality (or final quality (Q)) by obtaining a mean/median of results (e.g., compression qualities of respective patches) extracted from the remaining patches (e.g., Y (e.g., M−K) patches). According to an embodiment, the processor 120 may use the represented quality predicted for the image, as an input of a compression quality of the image in a compression artificial removal and/or image correction operation described below.

Figure 8:
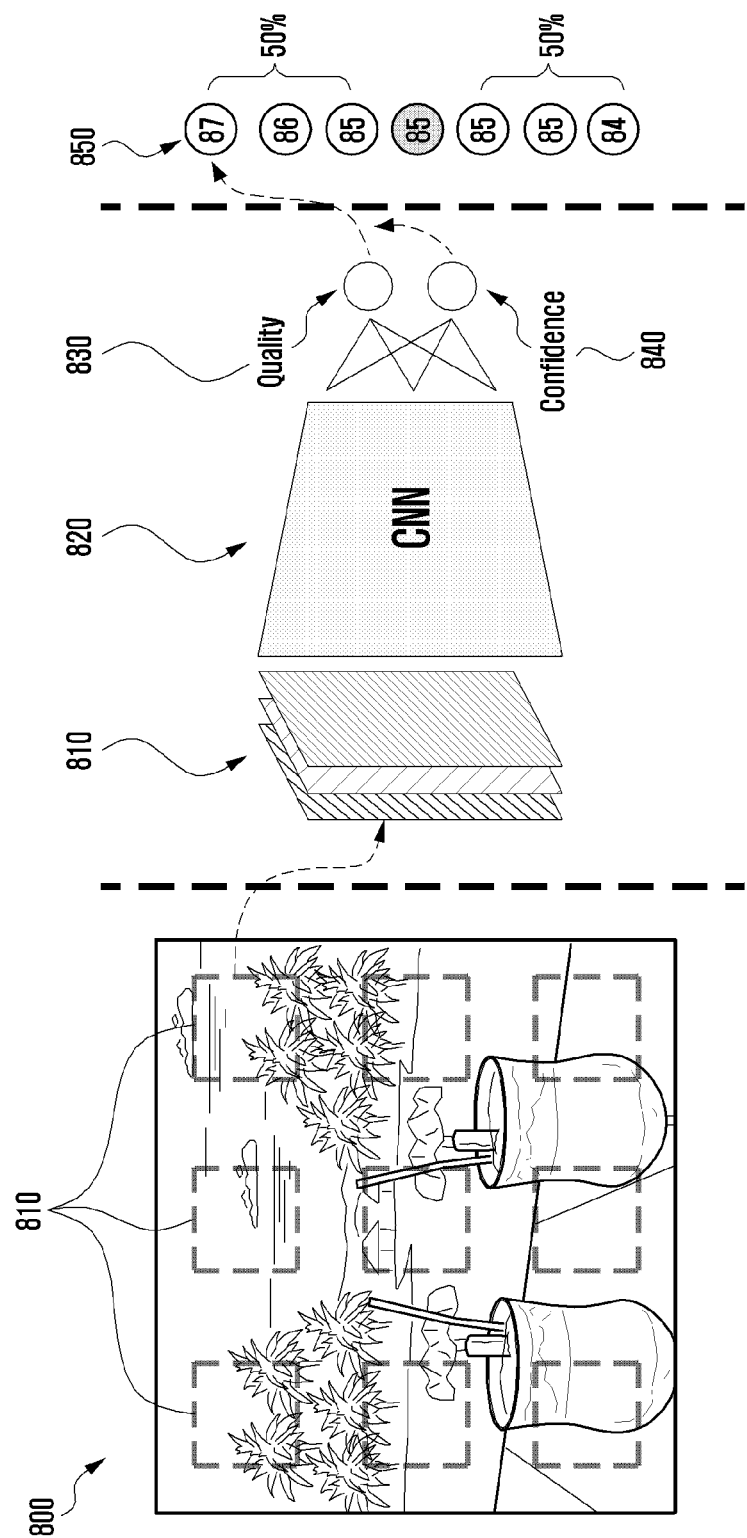
FIG. 8 illustrates an example of an inference operation for quality prediction by an electronic device according to an example embodiment.

FIG. 8 illustrates an example of an inference operation for quality prediction by an electronic device according to an example embodiment.

According to an embodiment, FIG. 8 may indicate an example of an operation of predicting a compression quality based on confidence in units of patches by an electronic device 101.

Referring to FIG. 8, the electronic device 101 may perform learning for estimation of confidence in units of patches. According to an embodiment, the electronic device 101 may use various machine learning methods as a method for estimating confidence in units of patches, and may implement confidence estimation through, for example, a convolutional neural network (CNN).

For example, when an image 800 (e.g., a compressed image) is provided, the electronic device 101 may predict the level of a compression quality of the corresponding image 800 by using a confidence-aware CNN 820 for each patch 810 of the image 800. According to an embodiment, in the example of FIG. 8, for the given image 800, it may be assumed that only nine input patches 810 in the entire region of the image 800 are inspected. According to an embodiment, each of the input patches 810 may include a compression coding block. In an embodiment, the patch 810 may be uniformly sampled through, for example, the sample patch extraction module 220. The sampled patch may be input to the CNN 820 for integral prediction, and, for example, nine pairs of quality results (e.g., quality 830 and confidence 840) may be obtained through the CNN 820.

According to an embodiment, the electronic device 101 may exclude a patch (e.g., two patches having low confidence) corresponding to an outlier having a value of confidence equal to or smaller than a designated threshold value (e.g., about 80%) in nine pairs of quality results. According to an embodiment, the electronic device 101 may obtain a mean/median of remaining patches (e.g., patches remaining after removing the patch corresponding to the outlier, and for example, seven patches having high confidence) having a value of confidence greater than a designated threshold value (e.g., about 80%) in the nine pairs of quality results. For example, in the example of FIG. 8, the electronic device 101 may obtain a mean/median of results 850 output from the seven patches, and predict (or derive) a representative quality (or final quality (Q)) of the image 800 by using a value of the mean (e.g., "85").

A machine learning method according to an embodiment is not limited to the CNN model, and various machine learning methods which can be used for classification of the compression quality may be used. For example, the machine learning method may include various machine learning methods such as a deep belief network (DBN), deep auto-encoder, a convolutional neural network (CNN), and/or a recurrent neural network (RNN).

According to an example embodiment, when performing prediction of the compression quality of the image (or class classification of the compression quality), the electronic device 101 may extract, for example, about 256 16×16 patches by using, for example, the sample patch extraction module 220, instead of checking all patches of the image, remove a patch corresponding to an outlier through the confidence estimation, and classify and integrate meaningful patches enabling compression quality prediction, thereby accurately and promptly predicting a final quality (Q) of the image. For example, when predicting the final quality (Q) based on extracted regions, the electronic device 101 may estimate confidence of the extracted regions, exclude a region in which confidence has a value equal to or smaller than a designated threshold value, in mean/median value calculation, and predict the final quality (Q).

According to an example embodiment, as illustrated in FIG. 8, the quality result of the CNN 820 may be divided into the quality 830 (e.g., a prediction result by learning of the quality prediction module 250) and the confidence 840 (e.g., a prediction result by learning of the confidence estimation module 240). For example, the electronic device 101 may predict a compression quality, based on a difference between a quality prediction result and a ground truth result of the confidence of quality prediction of each patch. For example, according to an example embodiment, while the quality prediction module 250 is learned, the confidence estimation module 240 may simultaneously and continuously measure a quality prediction performance of the input patch, and may be learned together so that the quality prediction module 250 can statistically identify a phenomenon in which the quality measurement performance of a specific type of input patch decreases.

For example, in a case of training of the CNN 820, an image (e.g., a raw image) may be compressed into a predetermined level and a ground truth label of a compression quality may be provided, but actual confidence (e.g., score) of quality prediction may not be provided. Hereinafter, an example of substantially estimating and providing a predicted quality level of confidence for each candidate patch (e.g., input patch) is described according to an example embodiment.

For example, when it is assumed that trained CNN mode G (·) can accurately predict a compression quality (e.g., $\hat{q}=G(x)$) of given input patch x, actual confidence ci of given input patch xi may be quantized as shown in <Equation 1> below.

$$c_i = m - |q_i - \hat{q}_i| \qquad \text{[Equation 1]}$$

In <Equation 1>, $\hat{q}_i$ may indicate a predicated quality of given i-th input patch xi, qi may indicate a true quality, and m may indicate a maximum or high quality level. For example, m may be configured as 100 in a case of libjpeg-turbo, and configured as 51 in a case of FFmpeg.

Accordingly, another confidence estimation module 240 may be trained by using the CNN model G (·) (e.g., the quality prediction module 250) and <Equation 1>.

$$\hat{c} = H(x) \qquad \text{[Equation 2]}$$

In <Equation 2>, ĉ may indicate estimated confidence of input patch x. For example, when L1 loss is assumed to be used for CNN model H (·) (e.g., the confidence estimation module 240) training, H(·) may estimate median number z having the smallest average deviation, among confidence measurement values for each candidate patch (e.g., input patch).

$$\operatorname{argmin}_z \mathbb{E}_c\{|z - c|\} \qquad \text{[Equation 3]}$$

However, the conventional method of using two networks G(·) and H(·) may be inefficient in that two learning stages and two inferences are required. Accordingly, in an example embodiment, two tasks of quality prediction and confidence estimation may share common features, and thus network F(·) may be implemented, as shown in <Equation 4> below, so that both the quality 830 and the confidence 840 can be output in one network.

$$\{\hat{q}, \hat{c}\} = \{F(x)_1, F(x)_2\} = F(x) \qquad \text{[Equation 4]}$$

However, in <Equation 4>, F(x)1 and F(x)2 may indicate first and second output units, respectively. Consequently, a loss function as shown in <Equation 5> below may be adopted.

$$\underset{\theta}{\mathrm{argmin}}\mathbb{E}_{(x,q)}\{|F_\theta(x)_1 - q| + \lambda|F_\theta(x)_2 - c|\} \quad \text{[Equation 5]}$$

In <Equation 5>, $F_\theta$ may indicate a confidence-aware CNN having parameter set θ. In an example embodiment, confidence estimation may be used for making classification into two categories of a reliable patch (e.g., an outlier region in the image) and an unreliable patch (e.g., a region in the image, in which meaningful compression quality prediction is possible). In addition, the quality prediction requires a more accurate quality output. In an embodiment, parameter 2 of reflecting relative importance of the confidence rather than the quality may be experimentally configured as 0.5, and a result therefrom may be indicated as below. In another embodiment, obtaining of a similar result even in a case where parameter 2 is 0.25 which is smaller than 0.5 may be experimentally identified.

According to an example embodiment, <Equation 1> to <Equation 5> may indicate an example of a background of dividing an output unit of the CNN 820 into the quality 830 and the confidence 840 and designing a loss function for learning, and this example is merely provided to help understanding of the disclosure, and does not limit an embodiment of the disclosure.

According to an example embodiment, <Table 1> and <Table 2> below may indicate an example of a result of an experiment using the quality prediction method according to an example embodiment. For example, <Table 1> may indicate an example of a result of an experiment in a case of using a JPEG codec, and <Table 2> may indicate an example in a case of using an H.264 codec. According to the quality prediction method according to an example embodiment (e.g., the fifth method in the examples of <Table 1> and <Table 2>), when the compression quality is measured through estimation of confidence of the input patch, a more accurate compression quality prediction result may be obtained in a similar time to or in a faster time than that required in the conventional other methods (e.g., the first method to fourth method). In an embodiment, the first method may indicate a MobileNetV2 algorithm, the second method may indicate an EfficientNet algorithm, the third method may indicate a block unit-based Naive algorithm, the fourth method may indicate a block unit-based Sobel algorithm, and the fifth method may indicate the quality prediction method (e.g., referred to as "Q1Net").

<Table 1> and <Table 2> may indicate performance comparison for a dataset, wherein a summary of an experiment result may be indicated with a total of 224×224 or 256×256 input pixels through comparison of a mean absolute error (MAE), stand deviation of errors (SDE), latency, and/or a model size between the respective methods. For example, in a task of predicting quality levels from 1 to 100, the fifth method may indicate that in a case of JPEG, excellent prediction performance is achieved with a result of about 0.43 of MAE and about 10 ms of a processing time, high confidence is achieved with a result of about 0.42 of SDE, and may indicate that in a case of H.264, excellent prediction performance is achieved with a result of about 0.48 of MAE and about 18 ms of processing time, and high confidence is achieved with a result of about 0.51 of SDE. As illustrated in <Table 1> and <Table 2>, the fifth method has a relatively superior performance and may derive a quality prediction result more accurately and promptly, compared to the conventional first to fourth methods.

TABLE 1

| | Method | | | | |
|---|---|---|---|---|---|
| | First method | Second method | Third method | Fourth method | Fifth method |
| MAE | 1.16 | 2.24 | 1.28 | 0.46 | 0.43 |
| SDE | 1.43 | 2.29 | 5.79 | 0.50 | 0.42 |
| Time (ms) | 7 | 12 | 9 | 14 | 10 |
| #Params | 2.32M | 4.13M | 125K | 125K | 125K |

TABLE 2

| | Method | | | | |
|---|---|---|---|---|---|
| | First method | Second method | Third method | Fourth method | Fifth method |
| MAE | 0.58 | 0.56 | 1.01 | 0.77 | 0.48 |
| SDE | 0.52 | 0.6 | 2.16 | 0.87 | 0.51 |
| Time (ms) | 7 | 12 | 18 | 21 | 18 |
| #Params | 2.32M | 4.13M | 208K | 208K | 208K |

According to the quality prediction method according to an example embodiment, the input of the CNN may be reduced to the size of a compression coding block. The input size used in the conventional image classification is about 224×224, but the size of the coding block used for the compression may be much smaller For example, the size may be 8×8 in a case of JPEG, and the size of the largest coding block may be 16×16 in a case of H.264. Accordingly, according to an example embodiment, the input size of the CNN can be effectively reduced, and since the CNN size is reduced, the number of parameters of the CNN may be reduced. According to an embodiment, the smaller the number of parameters of a machine learning model, a calculation amount decreases, and thus when a single block is used as a reference, much lower algorithm latency can be achieved during the inference, compared to the conventional image classification network.

In addition, according to an example embodiment, the number of inferred blocks (or patches) may be variably received, and thus compression quality measurement can be effectively and accurately performed even in a cheap electronic device or an old electronic device having a relatively low computing capacity. In addition, in the image such as a super-resolution image, the method may be used before image quality enhancement, whereby amplification of an artifact (or noise) can be prevented or reduced, or the method may be applied to a browser, whereby the necessity of enhancement or an enhancement strength of a high-compression low-quality image received from an external server (e.g., Internet) can be promptly identified.

According to an example embodiment, the artifact removal for enhancing the quality of the compressed image and detail preservation may be in a relationship of "trade off". For example, when the artifact is perfectly removed, the detail of the image may disappear, and when the detail is maintained, the artifact may not be removed. Accordingly, as more artifacts are removed from the image, the detail may disappear, and a more blurred image may be obtained. Therefore, performance of selecting a noise removal model for artifact removal can be enhanced (e.g., a more accurate noise removal model corresponding to an accurate compression quality can be selected) by using a quality value (e.g., a final quality (Q) predicted based on the confidence estimation in units of blocks) inferred according to the quality prediction method, and consequently, the entire quality of the image can be enhanced.

Figure 9:
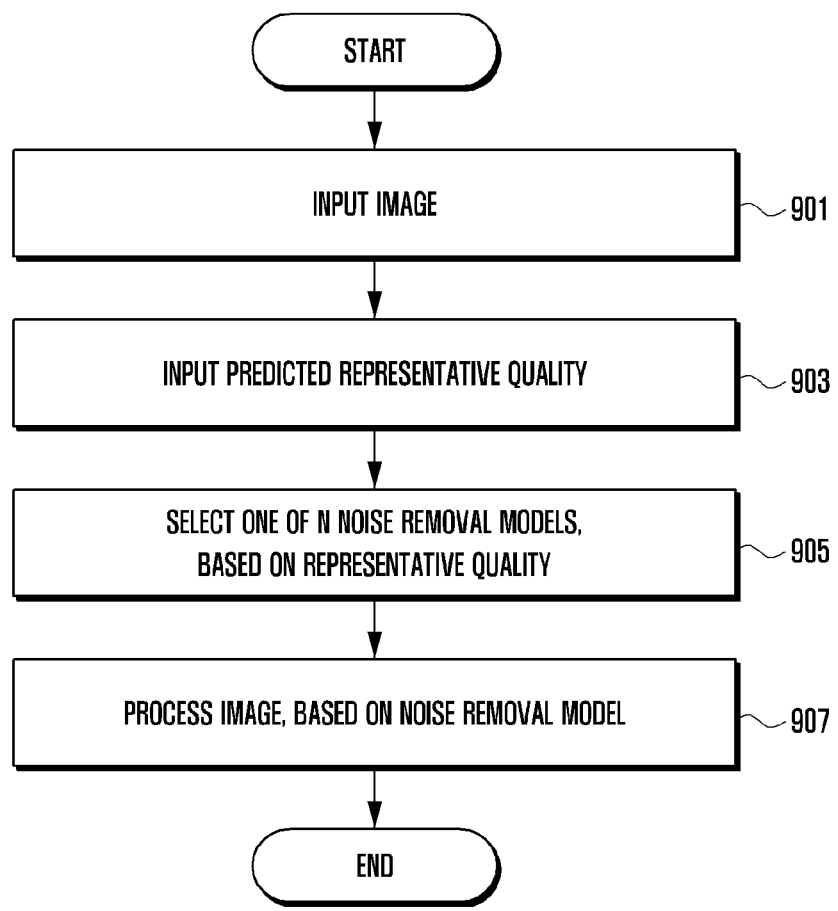
FIG. 9 is a flowchart illustrating an operation method of removing an artifact by an electronic device according to an example embodiment.

FIG. 9 is a flowchart illustrating an operation method of removing an artifact by an electronic device according to an example embodiment.

According to an embodiment, FIG. 9 may indicate an example of an operation of removing an artifact, based on a noise removal model (e.g., see 260 in FIG. 2) learned to corresponding to a classified compression quality by an electronic device 101.

Referring to FIG. 9, in operation 901, the processor 120 of the electronic device 101 may input an image. According to an embodiment, the processor 120 may input an image (e.g., an image subjected to learning in FIG. 7) having a compression quality to be enhanced as an image of a subject of compression artifact removal.

In operation 903, the processor 120 may input a predicted representative quality. According to an embodiment, the processor 120 may input the predicted representative quality in FIG. 7 as a compression quality of the image of the subject of compression artifact removal.

In operation 905, the processor 120 may select one of N noise removal models, based on the representative quality. According to an embodiment, the processor 120 may select a noise removal model (e.g., translation model i) learned to correspond to the representative quality of the given image, among N transform models pre-learned for each of various compression qualities. According to an embodiment, for the given image, the processor 120 may select a first noise removal model corresponding to the classification of a first compression quality when classification is made as the first compression quality, select a second noise removal model corresponding to a second compression quality when classification is made as the second compression quality, and select a third noise removal model corresponding to a third compression quality when classification is made as the third compression quality.

In operation 907, the processor 120 may perform image processing based on the selected noise removal model. According to an embodiment, the processor 120 may process image correction by using the selected noise removal model, based on a compression quality (e.g., a representative quality) of the image, among multiple noise removal models. According to an embodiment, the processor 120 may remove a compression artifact (or noise) from the given image (e.g., the compressed image) according to a correction strength corresponding to the selected noise removal mode, so as to restore the given image (e.g., the compressed image) to an original image before compression. For example, the processor 120 may restore the compressed image to an image (e.g., an original image) having an original quality.

Figure 10:
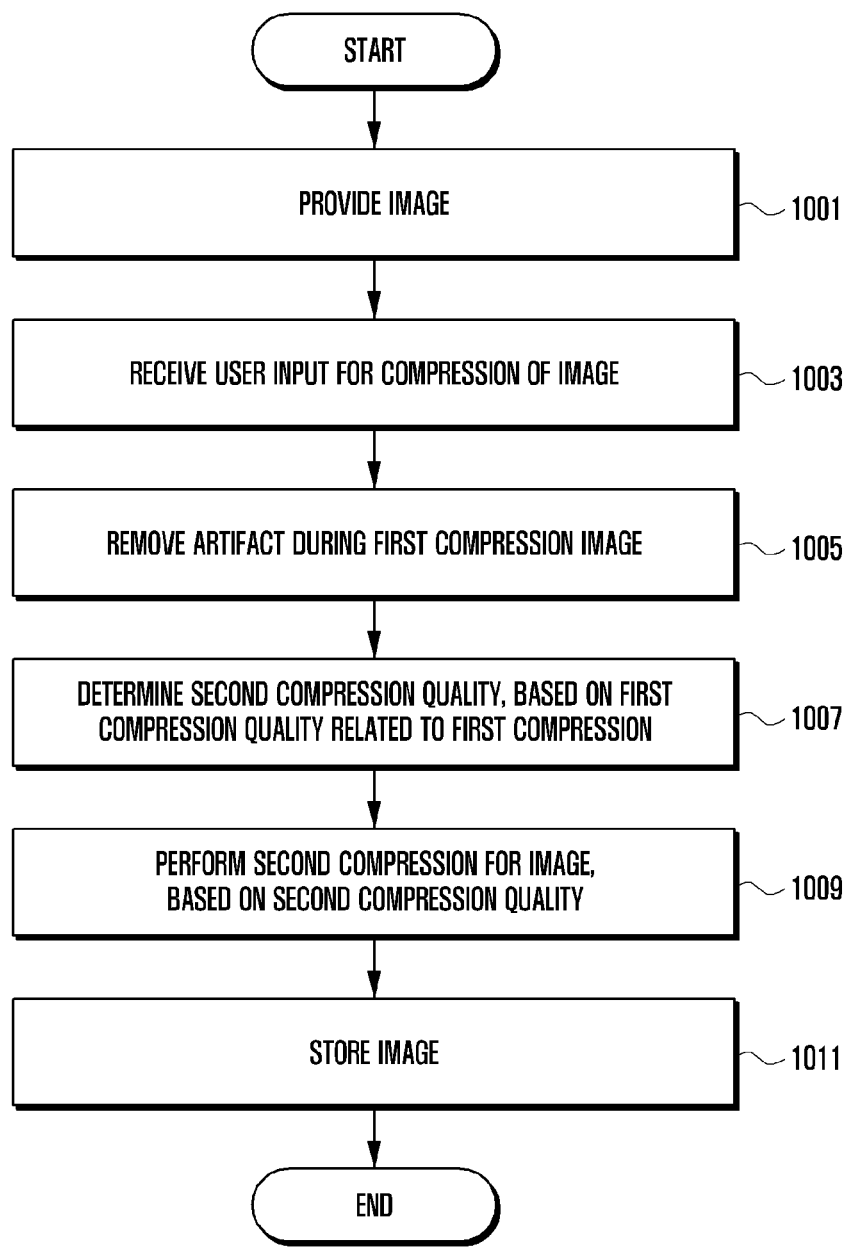
FIG. 10 is a flowchart illustrating an operation method of compressing an image by an electronic device according to an example embodiment.

FIG. 10 is a flowchart illustrating an operation method of compressing an image by an electronic device according to an example embodiment.

According to an example embodiment, FIG. 10 illustrates an example of an operation of compressing (or encoding) (e.g., secondary compression) a compressed image again.

Referring to FIG. 10, in operation 1001, the processor 120 of the electronic device 101 may provide an image. According to an embodiment, the processor 120 may display the compressed image corresponding to a user selection, or display an image list including at least one compressed image.

In operation 1003, the processor 120 may receive a user input for image compression. According to an embodiment, the processor 120 may detect a user input causing execution of compression of a provided image (or at least one image selected by a user). In an embodiment, the user input may be input based on a storage command of the image, a menu-based compression command, and/or a selection based on a designated object for compression. For example, the user may desire to perform editing (e.g., cropping, rotating, brightness adjustment, resolution adjustment, color adjustment, definition adjustment, size adjustment, format changing, and/or effect configuration) of the image through a designated application (e.g., a gallery application or an image editing application), and store the edited image.

In operation 1005, the processor 120 may remove an artifact during first compression of the image. According to an example embodiment, the processor 120 may receive a user input related to the compression of the image, and identify a first compression quality related to the previous compression (e.g., the first compression) of the mage, based on the user input. According to an embodiment, the processor 120 may remove an artifact (e.g., an artifact in a high-frequency component region in the image) generated during the first compression, based on a noise removal model corresponding to the first compression quality.

In operation 1007, the processor 120 may determine a second compression quality, based on a first compression quality related to the first compression. According to an embodiment, the processor 120 may determine a quality parameter for secondary encoding by using the quality prediction module 250. For example, when encoding (e.g., second compression) the compressed image again after the editing, the processor 120 may determine a compression quality (or a compression level) of the image again.

For example, with respect to an image once encoded with a low quality, even though the image is encoded again with a high quality, the degraded detail may not be restored. For example, even though the second compression quality related to the second compression is configured to be higher than the first compression quality related to the first compression, information (e.g., high-frequency component information) which has been already lost by the first compression cannot be restored. Accordingly, the processor 120 may configure a maximum or high value of the second compression quality with a compression quality at a similar level to that of the first compression quality. For example, when the first compression is performed to the image with about 70 of the first compression quality, the second compression quality may not be configured with about 80 or higher. Here, the greater the compression quality number, the better the quality derived.

According to an example embodiment, during the second compression, the processor 120 may encode the image with a compression quality (e.g., a compression quality slightly higher relative to the first compression quality) similar to the original (e.g., the first compression quality), thereby reducing a file size of the image and reducing a storage size.

In operation 1009, the processor 120 may perform second compression of the image, based on the second compression quality. For example, the image may have a high-frequency component generated due to the compression artifact generated in the first compression, and another artifact may be generated in the process of compressing the corresponding high-frequency component. Accordingly, the processor 120 may remove, before performing the second compression, the compression artifact generated in the first compression, and then perform the second compression.

In operation 1011, the processor 120 may store the image. For example, the processor 120 may store the image generated according to the second compression in the memory 130. According to an embodiment, when storing the image, the processor 120 may store the image by replacing the original image, or store an image separate from the original image.

Figure 11:
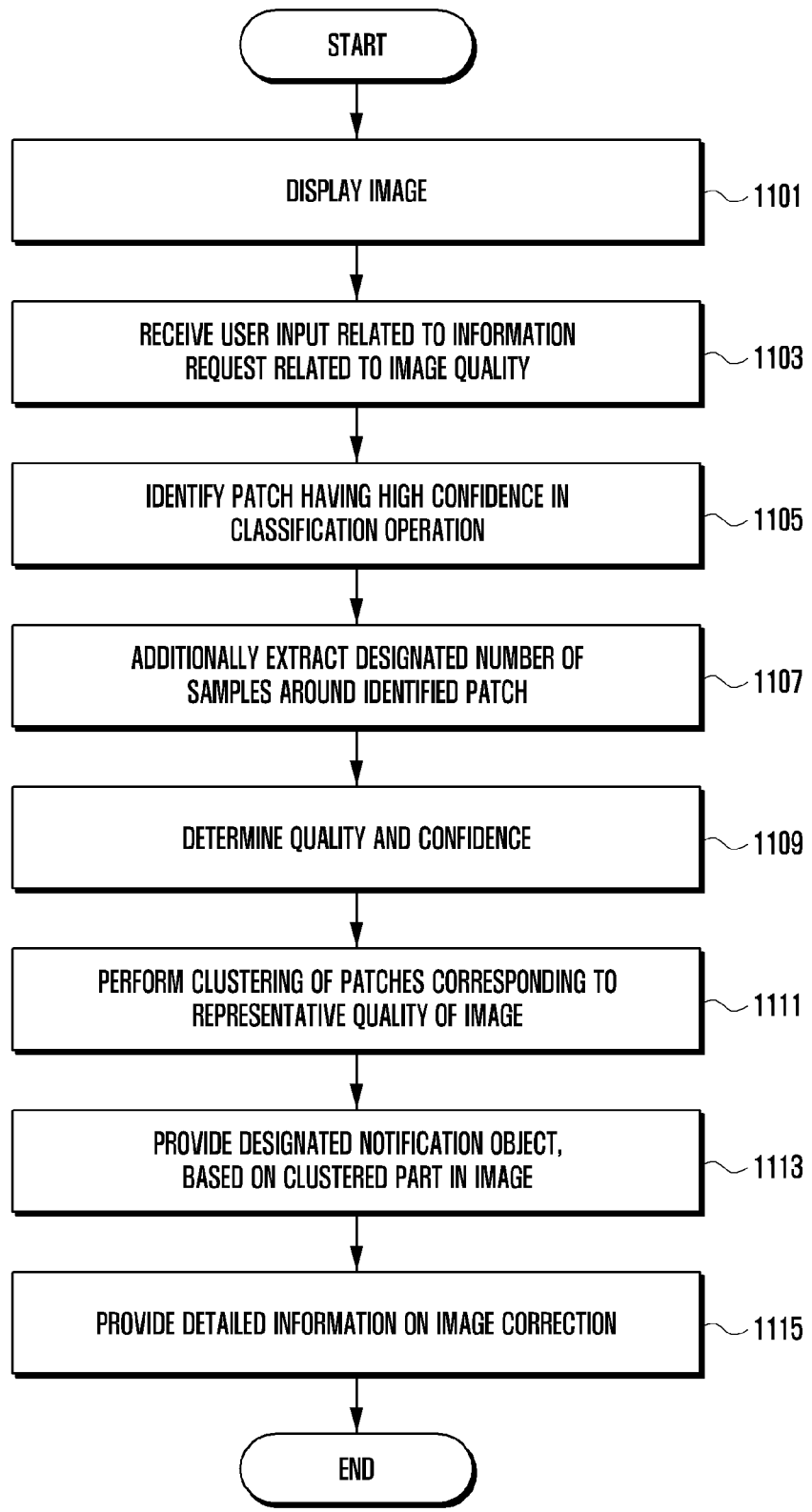
FIG. 11 is a flowchart illustrating an operation method of providing information on image correction by an electronic device according to an example embodiment.

FIG. 11 is a flowchart illustrating an operation method of providing information on image correction by an electronic device according to an example embodiment.

Figure 12:
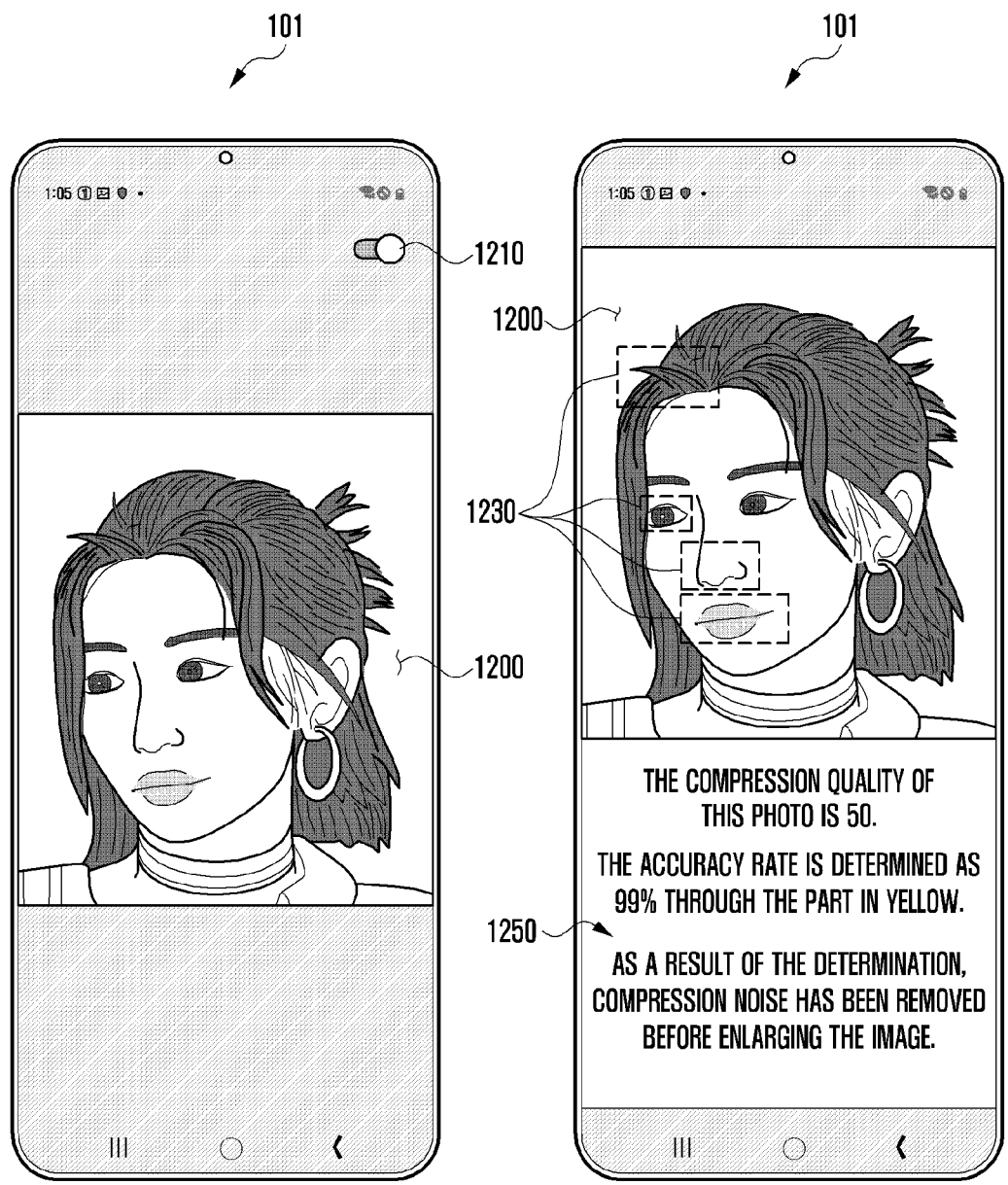
FIG. 12 illustrates a user interface for providing information on image correction by an electronic device and an example of an operation thereof, according to an example embodiment.

FIG. 12 illustrates a user interface for providing information on image correction by an electronic device and an example of an operation thereof, according to an example embodiment.

According to an embodiment, FIGS. 11 and 12 may indicate an example of an operation of providing correction information (e.g., a compression quality score (or level), correction region notification object, and/or detailed information of correction) of an image provided by a designated application (e.g., a gallery application or an image editing application).

Referring to FIG. 11, in operation 1101, the processor 120 of the electronic device 101 may display a screen including an image. According to an embodiment, the processor 120 may execute a designated application, and visually provide the image through the display module 160, based on the designated application. For example, as illustrated in FIG. 12, the processor 120 may control the display module 160 to display a screen including an image 1200 selected by a user through the gallery application. According to an embodiment, the image 1200 may indicate a compressed image compressed at a designated compression quality (or compression rate or compression level).

In operation 1103, the processor 120 may receive a user input of requesting information related to the quality of the image. According to an embodiment, the processor 120 may detect a user input of commanding to provide information (e.g., a compression quality score (or level), a correction region notification object, and/or detailed information of correction) on correction of the provided image. According to an embodiment, the user input may be input based on a menu-based request command and/or a designated object-based selection for provision of correction information.

For example, as illustrated in FIG. 12, the processor 120 may detect, in the gallery application, a user input through a function execution object 1210 designated to execute a function (e.g., an AI remastering function) of providing information on correction of the image. In an embodiment, the function (e.g., the AI remastering function) of providing information on the correction of the image may indicate a function of automatically correcting (e.g., enhancing the quality of) the image by using AI, and providing correction information of the automatic correction.

According to an example embodiment, the electronic device 101 may provide the function execution object 1210 designated for execution of the remastering function, through a designated region (e.g., an upper-right region on a screen, an upper-left region on a screen, or a lower-center region on a screen) on a screen on which the image 1200 is displayed. According to an embodiment, the processor 120 may execute the remastering function, based on a user input using the function execution object 1210, and may provide a user interface as illustrated in FIG. 12. According to an example embodiment, the processor 120 may detect a user input of selecting an option designated to execute a function of providing information on correction of the image, through the entry to the menu in the gallery application.

In operation 1105, the processor 120 may identify a patch having high confidence in a classification operation. According to an embodiment, the processor 120 may identify a patch (e.g., a position or a region of the patch) extracted in an operation of classifying a compression quality (e.g., an operation of predicting a compression quality, based on confidence in units of blocks), in the given image In operation 1107, the processor 120 may additionally extract a designated number of samples around the identified patch. According to an embodiment, the processor 120 may additionally extract a designated number (e.g., about A) of samples for measuring a quality (e.g., the quality 830 of FIG. 8) and confidence (e.g., the confidence 840 of FIG. 8), around the extracted patch (e.g., the position or the area of the patch).

In operation 1109, the processor 120 may determine the quality and the confidence. According to an embodiment, the processor 120 may measure the quality and the confidence, based on the extracted patch and the samples additionally extracted around the extracted patch.

In operation 1111, the processor 120 may perform clustering of patches corresponding to a representative quality (e.g., a final quality (Q)) of the image. According to an embodiment, the processor 120 may compare the representative quality of the image with the compression quality according to the quality and the confidence measured in operation 1109, so as to perform clustering of patches each having the compression quality corresponding to the representative quality of the image and having relatively high confidence compared to another patch, among the extracted patches.

In operation 1113, the processor 120 may provide a designated notification object, based on a part (or a region) clustered in the image. According to an embodiment, the processor 120 may provide a dotted line in a designated color and/or an overlaid mask, through the part clustered in the image. For example, as illustrated in FIG. 12, the processor 120 may provide a notification object 1230 (e.g., an object in a yellow dotted-line) for the clustered part in the given image 1200, so as to provide a user with information on the image correction part. In an embodiment, the notification object 1230 may indicate an object for intuitively notifying the user of the clustered part (e.g., the corrected region) in the given image.

In operation 1115, the processor 120 may provide detailed information on the image correction (e.g., information related to the compression quality of the mage (or quality notification information)). According to an embodiment, the processor 120 may provide detailed information (e.g., an overall score and a description of a reason why the quality of the image is classified as a current quality) on the image correction together with the notification object based on the image. For example, as illustrated in FIG. 12, the processor 120 may provide detailed information 1250 relating to a correction result of the image 1200 (e.g., guidance text such as "The compression quality of this photo is 50. The accuracy rate is determined as 99% through the part in yellow. As a result of the determination, compression noise has been removed before enlarging the image."). For example, while the overall score (e.g., "50") of the compression quality of the image 1200 is displayed, a reason why the quality is classified as the corresponding quality may be guided to the user.

According to an example embodiment, when providing correction information (e.g., a compression quality score (or level), a notification region notification object, and/or detailed information of the correction) of the image provided by a designated application (e.g., a gallery application, an image editing application, or a web page application), the processor 120 may provide the information in various ways according to various designated conditions. According to an embodiment, the processor 120 may determine the type of the designated application and the depth of a menu, and provide different pieces of correction target information and correction information according thereto, based on the type of the designated application and/or the depth of the menu. For example, the processor 120 may determine target information (e.g., resolution, brightness, color, and/or definition) to be provided and the level of detail of the provided information, according to the type of the designated application and/or the depth of the menu, and provide the correction information in different schemes according to a result of the determination.

According to an example embodiment, when a remastering function for a selected image is executed in a first application (e.g., a gallery application), the depth of a menu may correspond to a minimum or low first depth (e.g., about depth 1), and the processor 120 may correct the image according to all target information (e.g., resolution, brightness, color, and/or resolution), and provide correction information (e.g., correction information based on the all target information) of a result of the correction. For example, the processor 120 may provide correction information (e.g., a compression quality score, a correction region notification object, and/or detailed information of correction) indicating the level of correction to the resolution, brightness, color, and/or definition in each part corresponding to the correction information in the image.

According to another example embodiment, when a remastering function for a selected image is executed in a second application (e.g., an image editing application), the depth of a menu may correspond to a second depth (e.g., about depth 2 to depth 3) greater than the first depth, and the processor 120 may correct the image according to designated partial target information (e.g., brightness, color, and definition) among all target information (e.g., resolution, brightness, color, and/or resolution), and provide correction information (e.g., correction information based on the partial target information) of a result of the correction. For example, the processor 120 may provide correction information (e.g., a compression quality score, a correction region notification object, and/or detailed information of correction) indicating the level of correction to the brightness, color, and/or definition in each part corresponding to the correction information in the image.

According to another example embodiment, when a remastering function for a selected image is executed in a third application (e.g., a web page application), the depth of a menu may correspond to a third depth (e.g., about depth 3 to 4) greater than the second depth, and the processor 120 may correct the image according to designated minimum target information (e.g., brightness and color) among the all target information (e.g., resolution, brightness, color, and/or resolution), and provide correction information (e.g., correction information based on the minimum target information) of a result of the correction. For example, the processor 120 may provide correction information (e.g., a compression quality score, a correction region notification object, and/or detailed information of correction) indicating the level of correction to the brightness and/or color in each part corresponding to the correction information in the image.

According to an example embodiment, when providing detailed information 1250 of correction of the image, the processor 120 may change a display position of the image 1200 and provide the detailed information 1250 through a separate window, based on screen segmentation, as illustrated in FIG. 12. According to another embodiment, the processor 120 may also provide the detailed information 1250 through a pop-up window or an overlay on the image 1200 while the display position of the image 1200 is fixed.

According to an example embodiment, when providing an image through a designated application (e.g., a gallery application), the electronic device 101 may provide the image (e.g., provide a remastering function) by automatically analyzing the image by using AI, and, for example, automatically correcting a low-quality image to a high-quality image. According to an embodiment, when providing the remastering function, the electronic device 101 may provide detailed information (or description) on a reason why the image has been enhanced. Accordingly, a user may be guided with detailed information on a reason why the quality of the corresponding image has been assessed (or enhanced). For example, the electronic device 101 may explicitly display a score of the corresponding image and provide a score of a part having high confidence, thereby providing the user with information on a part of the image, which causes determination that the given image has specific degradation to be made. For example, the electronic device 101 may intuitively provide the notification object 1230 on the image and the detailed information 1250 including notification information of the image score and the degradation determination in the image, thereby allowing the user to understand a reason for image enhancement in more detail.

An operation method performed by an electronic device 101 according to an embodiment may include displaying an image through a display module of the electronic device, extracting designated multiple blocks from the image in a designated scheme, estimating confidence for each of the multiple blocks, identifying, based on the estimation of the confidence, a first block corresponding to an outlier to be excluded in quality prediction, and a second block for which quality prediction is possible, among the multiple blocks, excluding the first block among the multiple blocks from a subject of quality prediction, and classifying a compression quality of the image by using the second block remaining after excluding the first block from among the multiple blocks.

According to an example embodiment, the classifying of the compression quality may include estimating at least one first block corresponding to an outlier having a value equal to or smaller than a designated threshold value, based on the estimation of the confidence in units of blocks, for the extracted multiple blocks, excluding the at least one first block in a mean operation for compression quality classification, performing the mean operation for the compression quality classification, based on at least one second block having a value greater than a designated threshold value, and classifying a result of the mean operation as a compression quality of the image.

According to an example embodiment, the operation method performed by the electronic device may include storing, in the memory, multiple noise removal models pre-learned for respective various compression qualities, selecting a noise removal model learned to correspond to a compression quality classified for the image from among the multiple noise removal models, and processing quality enhancement for the image, based on the selected noise removal model.

According to an example embodiment, the operation method performed by the electronic device may include receiving a user input of requesting information related to an image quality of the image, and control, based on the reception of the user input, the display module to display correction information of the image, based on the image.

According to an example embodiment, the operation method performed by the electronic device may include identifying at least one block having a compression quality corresponding to a representative quality of the image, based on the reception of the user input, providing a designated notification object and detailed information on image correction, based on a part corresponding to the identified block, and displaying detailed information including a total score of the image correction and a description of the classification, together with the notification object.

According to an example embodiment, the operation method performed by the electronic device may include receiving a user input for compression of the image, removing, based on the reception of the user input, the artifact generated during the first compression, based on a noise removal model corresponding to a first compression quality during the first compression of the image, determining a second compression quality for the second compression, based on the first compression quality related to the first compression, and performing the second compression of the image, based on the second compression quality.

Various embodiments of the disclosure described and shown in the specification and the drawings have presented specific examples in order to easily explain the technical contents and help understanding of the disclosure, and are not intended to limit the scope of the disclosure. Therefore, the scope of the disclosure should be construed to include, in addition to the embodiments disclosed herein, all changes or modifications

The invention claimed is:

1. An electronic device comprising:
   a display;
   at least one processor including processing circuitry operatively connected to the display and the memory; and
   memory storing instructions that, when executed by the at least one processor individually or collectively, cause the electronic device to:
   display compressed image via the display,
   extract multiple blocks from the compressed image as a region of interest (ROI),
   estimate a confidence value for analyzing a compression rate corresponding to each of the extracted multiple blocks,
   identify, based on at least the estimated confidence value, at least one first block having a confidence value equal to or smaller than a designated threshold value,
   perform a mean operation for compression rate classification excluding the identified at least one first block from the mean operation, based on at least one second block having a confidence value greater than the designated threshold value, and
   determine a compression rate of the compressed image by classifying a result of the mean operation.

2. The electronic device of claim 1, wherein the instructions, when executed by the at least one processor individually or collectively, cause the electronic device to:
   select a noise removal model learned to correspond to a compression rate classified for the compressed image,
   process quality enhancement for the compressed image, based on the selected noise removal model, to provide an enhanced image, and
   process the enhanced image, based on a designated operation.

3. The electronic device of claim 2, wherein the instructions, when executed by the at least one processor individually or collectively, cause the electronic device to:
   store, in the memory, multiple noise removal models pre-learned for respective various compression rates, and
   select a noise removal model learned to correspond to the classification of the compression rate of the compressed image from among the multiple noise removal models.

4. The electronic device of claim 2, wherein the instructions, when executed by the at least one processor individually or collectively, cause the electronic device to process the enhanced image according to at least one of: displaying through the display, storing in the memory, or transmission outside of the electronic device.

5. The electronic device of claim 1, wherein the instructions, when executed by the at least one processor individually or collectively, cause the electronic device to:
   receive a user input of requesting information related to an image quality of the compressed image, and
   control, based on the reception of the user input, the display to display correction information of the compressed image, based on the compressed image.

6. The electronic device of claim 5, wherein the instructions, when executed by the at least one processor individually or collectively, cause the electronic device to:
   identify at least one block having a compression rate corresponding to a representative quality of the compressed image, based on the reception of the user input, and
   provide a designated notification object and detailed information on image correction, based on the identified block.

7. The electronic device of claim 6, wherein the instructions, when executed by the at least one processor individually or collectively, cause the electronic device to:
   identify a block having high confidence value from the compressed image,
   measure a quality and confidence value for the identified block,
   compare each of block-specific compression rates according to the measured quality and confidence value with a representative quality of the compressed image,
   perform clustering of blocks each having a compression rate corresponding to the representative quality, among the block-specific compression rates, and having relatively high confidence value compared to other blocks,
   provide the designated notification object, based on a part corresponding to the clustered blocks in the compressed image, and
   control the display to display detailed information including a total score of the compressed image correction and a description of the classification, together with the notification object.

8. The electronic device of claim 1, wherein the instructions, when executed by the at least one processor individually or collectively, cause the electronic device to, when performing a second compression of the compressed image, remove an artifact generated during a first compression of the compressed image and then perform the second compression.

9. The electronic device of claim 8, wherein the instructions, when executed by the at least one processor individually or collectively, cause the electronic device to:

receive a user input for compression of the compressed image, based on the reception of the user input, remove the artifact generated during the first compression, based on a noise removal model corresponding to a first compression rate during the first compression of the compressed image, determine a second compression rate for the second compression, based on the first compression rate related to the first compression, and perform the second compression of the compressed image, based on the second compression rate.

10. The electronic device of claim 9, wherein the instructions, when executed by the at least one processor individually or collectively, cause the electronic device to determine the second compression rate to correspond to the first compression rate.

11. The electronic device of claim 1, wherein the processor comprises a confidence estimation module and a quality prediction module for classification of the compression rate, and wherein while learning the quality prediction module, the instructions, when executed by the at least one processor individually or collectively, cause the electronic device to learn the quality prediction module, and the confidence estimation module together.

12. The electronic device of claim 1, wherein the instructions, when executed by the at least one processor individually or collectively, cause the electronic device to predict the compression rate of the compressed image by using a learning model learned using an artificial intelligence algorithm.

13. An operation method of an electronic device, the method comprising:

displaying compressed image via a display of the electronic device;

extracting multiple blocks from the compressed image as a region of interest (ROI);

estimating a confidence value for analyzing a compression rate corresponding to each of the extracted multiple blocks;

identifying, based on at least the estimated confidence value, at least one first block having a confidence value equal to or smaller than a designated threshold;

performing a mean operation for the compression rate classification excluding the identified at least one first block from the mean operation, based on at least one second block having a confidence value greater than the designated threshold value; and determining a compression rate of the compressed image by classifying a result of the mean operation.

14. The method of claim 13, further comprising:

storing multiple noise removal models pre-learned for respective various compression rates, selecting a noise removal model learned to correspond to the classification of the compression rate of the compressed image from among the multiple noise removal models, and processing quality enhancement for the compressed image, based on the selected noise removal model, to provide an enhanced image.

15. The method of claim 13, further comprising:

receiving a user input of requesting information related to an image quality of the compressed image, and controlling, based on the reception of the user input, to display correction information of the compressed image, based on the compressed image.

16. The method of claim 15 further comprising:

identifying at least one block having a compression rate corresponding to a representative quality of the compressed image, based on the reception of the user input, providing a designated notification object, based on a part corresponding to the identified blocks in the compressed image, and controlling to display detailed information including a total score of the compressed image correction and a description of the classification, together with the notification object.

17. The method of claim 13, further comprising:

receiving a user input for compression of the compressed image, based on the reception of the user input, removing an artifact generated during a first compression, based on a noise removal model corresponding to a first compression rate during the first compression of the compressed image, determining a second compression rate for a second compression, based on the first compression rate related to the first compression, and performing the second compression of the compressed image, based on the second compression rate.

* * * * *